US012745229B2

(12) United States Patent
Awad et al.

(10) Patent No.: US 12,745,229 B2
(45) Date of Patent: Sep. 22, 2026

(54) METHODS, COMMUNICATIONS DEVICES, AND INFRASTRUCTURE EQUIPMENT

(71) Applicant: Sony Group Corporation, Tokyo (JP)

(72) Inventors: Yassin Aden Awad, Basingstoke (GB); Vivek Sharma, Basingstoke (GB); Hideji Wakabayashi, Basingstoke (GB); Yuxin Wei, Basingstoke (GB)

(73) Assignee: SONY GROUP CORPORATION, Tokyo (JP)

(*) Notice: Subject to any disclaimer, the term of this patent is extended or adjusted under 35 U.S.C. 154(b) by 550 days.

(21) Appl. No.: 18/037,773

(22) PCT Filed: Nov. 15, 2021

(86) PCT No.: PCT/EP2021/081738
§ 371 (c)(1),
(2) Date: May 19, 2023

(87) PCT Pub. No.: WO2022/128286
PCT Pub. Date: Jun. 23, 2022

(65) Prior Publication Data

US 2024/0008015 A1 Jan. 4, 2024

(30) Foreign Application Priority Data

Dec. 18, 2020 (EP) .................................... 20215586

(51) Int. Cl.
*H04W 72/0457* (2023.01)
*H04W 52/02* (2009.01)
(Continued)

(52) U.S. Cl.
CPC ... *H04W 72/0457* (2023.01); *H04W 52/0216* (2013.01); *H04W 72/232* (2023.01); *H04W 72/30* (2023.01); *H04W 76/20* (2018.02)

(58) Field of Classification Search
CPC .......... H04W 72/0457; H04W 72/232; H04W 72/30; H04W 76/20; H04W 72/0453; H04W 52/0216; Y02D 30/70
See application file for complete search history.

(56) References Cited

U.S. PATENT DOCUMENTS

2019/0132857 A1 5/2019 Babaei et al.
2019/0200396 A1* 6/2019 Agiwal ................ H04W 28/20
(Continued)

OTHER PUBLICATIONS

International Search Report and Written Opinion mailed on Feb. 28, 2022, received for PCT Application PCT/EP2021/081738, filed on Nov. 15, 2021, 12 pages.
(Continued)

*Primary Examiner* — Michael K Phillips
(74) *Attorney, Agent, or Firm* — XSENSUS, LLP

(57) ABSTRACT

A method of operating a communications device configured to transmit signals to and/or to receive signals from wireless communications networks is provided. The method comprises operating in one of an idle state and an inactive state and, when operating in the one of the idle state and the inactive state, receiving, via a broadcasted signal from the wireless communications network, a configuration of at least two bandwidth parts, BWPs, for use by the communications device in transmitting signals to and/or receiving signals from the wireless communications network while remaining in the one of the idle state and the inactive state. Radio resources forming a first of the BWPs at least partially overlap in both frequency and time with radio resources forming a second of the BWPs. The first BWP and the second BWP have a same numerology.

20 Claims, 12 Drawing Sheets

(51) Int. Cl.

| | |
|---|---|
| ***H04W 72/232*** | (2023.01) |
| ***H04W 72/30*** | (2023.01) |
| ***H04W 76/20*** | (2018.01) |

(56) References Cited

U.S. PATENT DOCUMENTS

| | | | | |
|---|---|---|---|---|
| 2019/0357300 | A1* | 11/2019 | Zhou | H04L 5/0094 |
| 2020/0106573 | A1* | 4/2020 | Cirik | H04L 5/0098 |
| 2020/0221408 | A1 | 7/2020 | Lee et al. | |
| 2021/0127450 | A1* | 4/2021 | Abdoli | H04W 52/0216 |
| 2022/0046588 | A1* | 2/2022 | Yeo | H04W 72/23 |
| 2022/0159574 | A1* | 5/2022 | Islam | H04W 52/0229 |
| 2023/0083993 | A1* | 3/2023 | Rune | H04W 74/0833 370/329 |
| 2023/0276458 | A1* | 8/2023 | Lee | H04W 72/232 370/329 |
| 2023/0284320 | A1* | 9/2023 | Xu | H04W 76/20 370/329 |

OTHER PUBLICATIONS

Vivo, "Discussion on basic functions for broadcast/multicast for RRC_IDLE/RRC_INACTIVE UEs", 3GPP TSG RAN WG1 #103-e, R1-2007693, Oct. 26-Nov. 13, 2020, 3 pages.

Moderator (BBC), "Summary # 3 on RAN basic functions for broadcast/multicast for UEs in RRC_IDLE/RRC_INACTIVE states", 3GPP TSG RAN WG1 #103-e, R1-2009554, Oct. 26-Nov. 13, 2020, 38 pages.

ZTE Corporation, "Revised work item proposal: 2-step RACH for NR", 3GPP TSG RAN Meeting #85, RP-192330, Sep. 16-20, 2019, 4 pages.

Qualcomm Inc., "Revised WID on NR-based Access to Unlicensed Spectrum", 3GPP TSG RAN Meeting #84, RP-191575, Jun. 3-6, 2019, 8 pages.

Nokia et al., "Revised WID: Support of NR Industrial Internet of Things (IoT)", 3GPP TSG RAN Meeting #85, RP-192324, Sep. 16-20, 2019, 6 pages.

3GPP, "NR; Radio Resource Control (RRC) protocol specification (Release 15)", 3GPP TS 38.331 V15.7.0, Sep. 2019, pp. 1-527.

3GPP, "Technical Specification Group Radio Access Network; Study on NR positioning support (Release 16)", 3GPP TR 38.855 V16.0.0, Mar. 2019, pp. 1-197.

Lin et al., "A Primer on Bandwidth Parts in 5G New Radio", Networking and Internet Architecture, 2004, pp. 1-7.

"Bandwidth Part Adaptation 5G NR User Experience & Power Consumption Enhancements", White Paper, Mediatek, PDFBPAWPA4 0219, 2018, pp. 1-15.

Samsung, "Potential positioning enhancements", 3GPP TSG RAN WG1 #103-e, R1-2008168, Oct. 26-Nov. 13, 2020, pp. 1-6.

Samsung, "RACH configuration for Small Data Transmission", 3GPP TSG-RAN2 Meeting #112 Electronic, R2-2009097, Nov. 2-Nov. 13, 2020, 6 pages.

Ericsson, "Details of RACH based SDT", 3GPP TSG-RAN WG2 #112e, Tdoc R2-2009963, Nov. 2-13, 2020, 6 pages.

LG Electronics Inc., "RACH-based Small Data Transmission", 3GPP TSG-RAN2#112-e, R2-2009457, Nov. 2-13, 2020, pp. 1-2.

Catt et al., "Revised SID: Study on NR Positioning Enhancements", 3GPP TSG RAN Meeting #89e, RP-202094, Sep. 14-18, 2020, 4 pages.

Huawei et al., "New Work Item on NR support of Multicast and Broadcast Services", 3GPP TSG RAN Meeting #86, RP-193163, Dec. 9-12, 2019, 5 pages.

ZTE Corporation, "Work Item on NR smalldata transmissions in Inactive state", 3GPP TSG RAN Meeting #86, RP-193252, Dec. 9-12, 2019, 4 pages.

Holma et al., "LTE for UMTS OFDMA and SC-FDMA Based Radio Access", John Wiley & Sons, 2009, pp. 25-27.

* cited by examiner

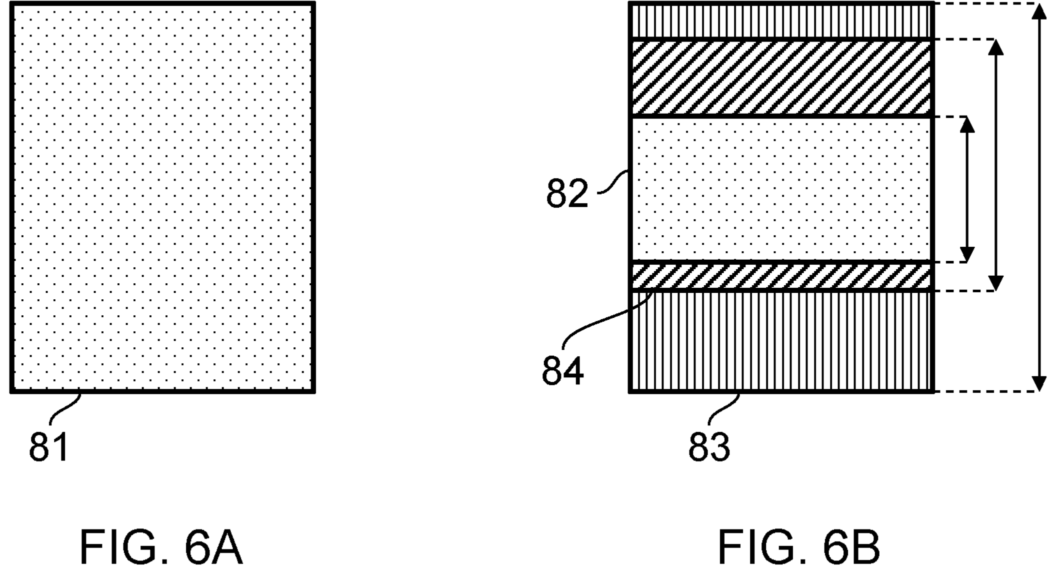
FIG. 6A
FIG. 6B
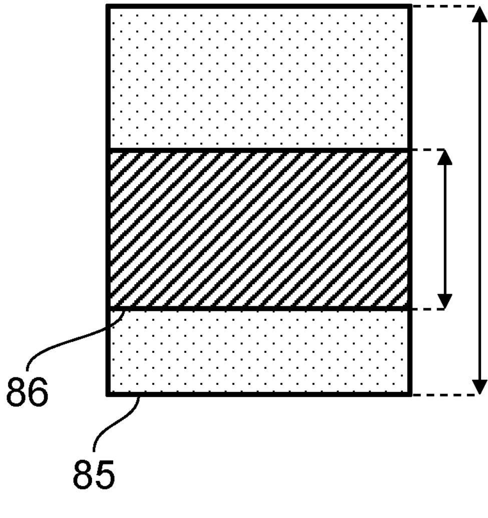
FIG. 6C

METHODS, COMMUNICATIONS DEVICES, AND INFRASTRUCTURE EQUIPMENT

CROSS-REFERENCE TO RELATED APPLICATIONS

The present application is based on PCT filing PCT/EP2021/081738, filed Nov. 15, 2021, which claims priority to European Patent Application No. 20215586.7, filed Dec. 18, 2020, the entire contents of each are incorporated herein by reference.

BACKGROUND

Field of Disclosure

FIELD OF DISCLOSURE

The present disclosure relates generally to communications devices which are configured to transmit data to and receive data from wireless communications networks, to infrastructure equipment forming part of such wireless communications networks, and to circuitry for and methods of operating the same, and specifically to bandwidth part (BWP) adaptation for communications devices operating in an idle or an inactive state.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

More recently developed wireless communications networks are expected to routinely and efficiently support communications with a wider range of devices associated with a wider range of data traffic profiles and types than current systems are optimised to support. For example, such wireless communications networks are expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

One aspect of LTE is a provision for communications devices to communicate directly with each other rather than communicating via a wireless communications network. Device-to-device communications or D2D communications has been specified for LTE for devices when both in coverage and out of coverage of a wireless communications network. To communicate devices transmit and receive signals via a D2D wireless access interface.

Future wireless communications networks will be expected to routinely and efficiently support communications with a wider range of devices associated with a wider range of data traffic profiles and types than current systems are optimised to support. For example it is expected future wireless communications networks will be expected to efficiently support D2D communications, whilst utilising features of such networks. There is therefore a desire for future wireless communications networks, for example those which may be referred to as 5G or new radio (NR) system/new radio access technology (RAT) systems, as well as future iterations/releases of existing systems, to support D2D communications as efficiently as possible.

The increasing use of different types of network infrastructure equipment and terminal devices associated with different traffic profiles give rise to new challenges for efficiently handling communications in wireless communications systems that need to be addressed.

SUMMARY OF THE DISCLOSURE

The present disclosure can help address or mitigate at least some of the issues discussed above.

Embodiments of the present technique can provide a method of operating a communications device configured to transmit signals to and/or to receive signals from wireless communications networks. The method comprises operating in one of an idle state and an inactive state and, when operating in the one of the idle state and the inactive state, receiving, via a broadcasted signal from the wireless communications network, a configuration of at least two bandwidth parts, BWPs, for use by the communications device in transmitting signals to and/or receiving signals from the wireless communications network while remaining in the one of the idle state and the inactive state. Radio resources forming a first of the BWPs at least partially overlap in both frequency and time with radio resources forming a second of the BWPs. The first BWP and the second BWP have a same numerology.

Embodiments of the present technique, in addition to methods of operating communications devices, also relate to communications devices, infrastructure equipment, methods of operating infrastructure equipment, and circuitry for communications devices and infrastructure equipment.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein:

FIGS. 6A to 6C illustrate known examples of a common frequency resource for use by UEs in an idle or an inactive state;

DETAILED DESCRIPTION OF THE EMBODIMENTS

Long Term Evolution Advanced Radio Access Technology (4G)

Figure 1:
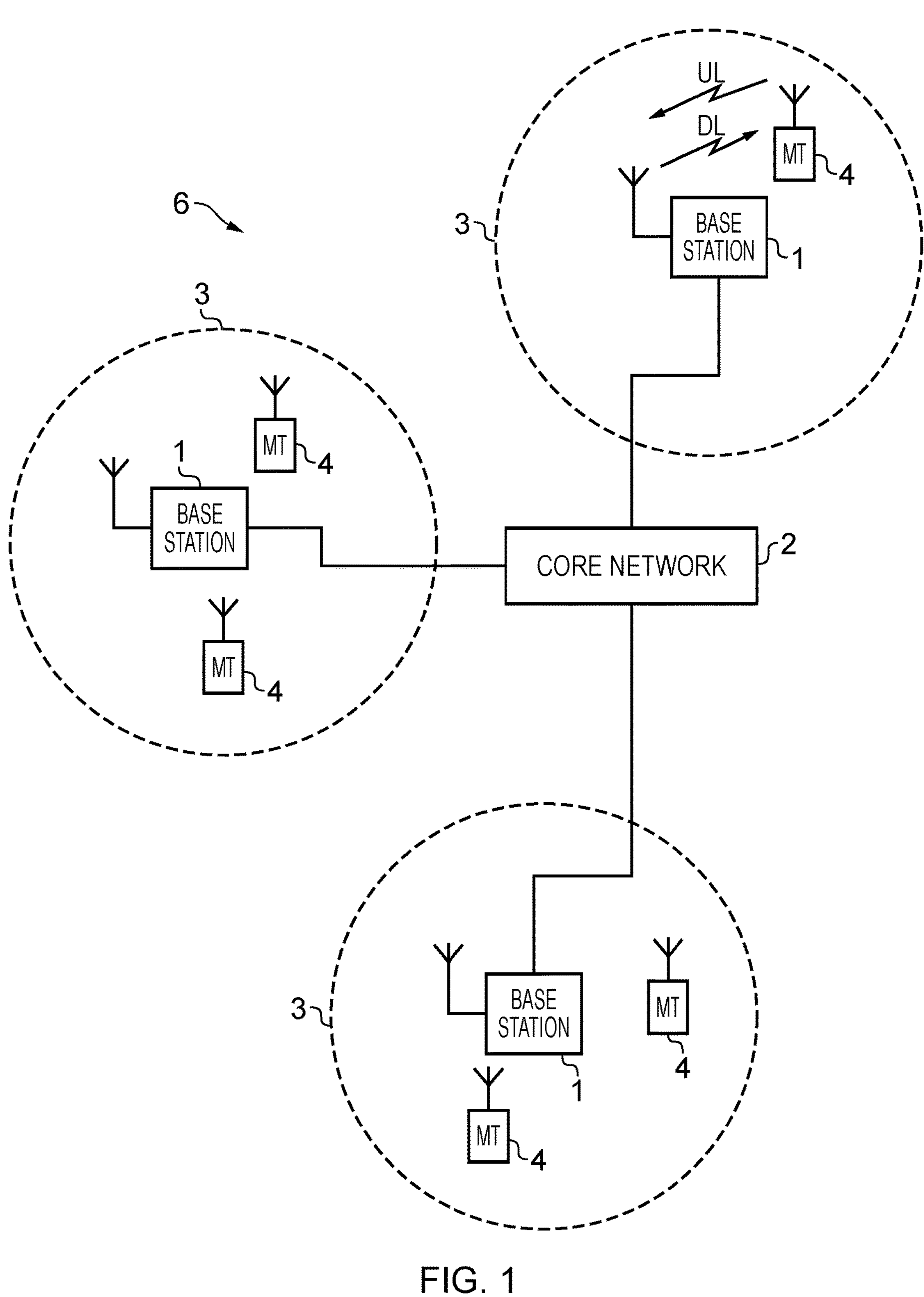
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 6 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [1]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 6 includes a plurality of base stations 1 connected to a core network 2. Each base station provides a coverage area 3 (i.e. a cell) within which data can be communicated to and from communications devices 4.

Although each base station 1 is shown in FIG. 1 as a single entity, the skilled person will appreciate that some of the functions of the base station may be carried out by disparate, inter-connected elements, such as antennas (or antennae), remote radio heads, amplifiers, etc. Collectively, one or more base stations may form a radio access network.

Data is transmitted from base stations 1 to communications devices 4 within their respective coverage areas 3 via a radio downlink. Data is transmitted from communications devices 4 to the base stations 1 via a radio uplink. The core network 2 routes data to and from the communications devices 4 via the respective base stations 1 and provides functions such as authentication, mobility management, charging and so on. Terminal devices may also be referred to as mobile stations, user equipment (UE), user terminal, mobile radio, communications device, and so forth.

Services provided by the core network 2 may include connectivity to the internet or to external telephony services. The core network 2 may further track the location of the communications devices 4 so that it can efficiently contact (i.e. page) the communications devices 4 for transmitting downlink data towards the communications devices 4.

Base stations, which are an example of network infrastructure equipment, may also be referred to as transceiver stations, nodeBs, e-nodeBs, eNB, g-nodeBs, gNB and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G) Wireless Communications System

3GPP has completed the basic version of 5G in Rel-15, known as the New Radio Access Technology (NR). In addition, enhancements have been made in Rel-16, incorporating new features such as the 2-step Random Access (RACH) procedure [2], Industrial Internet of Things (IIoT) [3] and NR-based Access to Unlicensed Spectrum (NR-U) [4]. Further enhancements have been agreed for Rel-17 NR, such as small data transmissions (SDT) [5], [6], [7], [8], Multicast and Broadcast Services (MBS) [9], and positioning enhancements [10].

Based on these new Rel-17 NR enhancements, supporting SDT, MBS, and positioning enhancements for UEs in both the RRC_INACTIVE and RRC_IDLE state has been proposed. This creates new challenges for both the network and the UE. For example, from the network's perspective, if only an initial bandwidth part (BWP) is used, it may not be able to provide the capacity required for all the above desired services due to its smaller size. From the UE's perspective, if larger resources/BWPs are employed, then the power consumption of the UE will be an issue while the UE remains in the RRC_INACTIVE mode or the RRC_IDLE mode.

Figure 2:
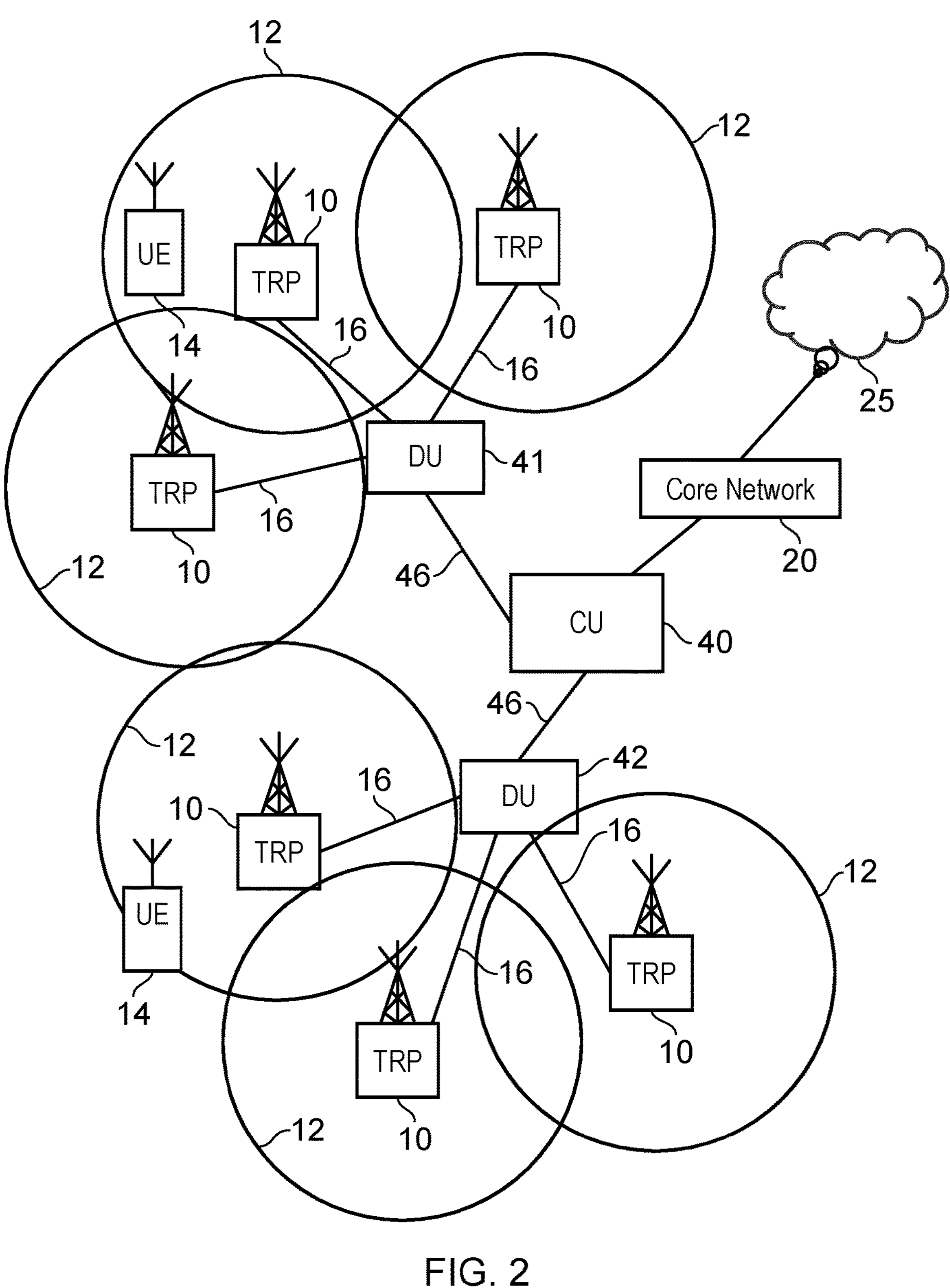
FIG. 2 schematically represents some aspects of a new radio access technology (RAT) wireless communications system which may be configured to operate in accordance with certain embodiments of the present disclosure.

An example configuration of a wireless communications network which uses some of the terminology proposed for and used in NR and 5G is shown in FIG. 2. In FIG. 2 a plurality of transmission and reception points (TRPs) 10 are connected to distributed control units (DUs) 41, 42 by a connection interface represented as a line 16. Each of the TRPs 10 is arranged to transmit and receive signals via a wireless access interface within a radio frequency bandwidth available to the wireless communications network. Thus, within a range for performing radio communications via the wireless access interface, each of the TRPs 10, forms a cell of the wireless communications network as represented by a circle 12. As such, wireless communications devices 14 which are within a radio communications range provided by the cells 12 can transmit and receive signals to and from the TRPs 10 via the wireless access interface. Each of the distributed units 41, 42 are connected to a central unit (CU) 40 (which may be referred to as a controlling node) via an interface 46. The central unit 40 is then connected to the core network 20 which may contain all other functions required to transmit data for communicating to and from the wireless communications devices and the core network 20 may be connected to other networks 25.

The elements of the wireless access network shown in FIG. 2 may operate in a similar way to corresponding elements of an LTE network as described with regard to the example of FIG. 1. It will be appreciated that operational aspects of the telecommunications network represented in FIG. 2, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The TRPs 10 of FIG. 2 may in part have a corresponding functionality to a base station or eNodeB of an LTE network. Similarly, the communications devices 14 may have a functionality corresponding to the UE devices 4 known for operation with an LTE network. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and communications devices of a new RAT network will be functionally similar to, respectively, the core network component, base stations and communications devices of an LTE wireless communications network.

In terms of broad top-level functionality, the core network 20 connected to the new RAT telecommunications system represented in FIG. 2 may be broadly considered to correspond with the core network 2 represented in FIG. 1, and the respective central units 40 and their associated distributed units/TRPs 10 may be broadly considered to provide functionality corresponding to the base stations 1 of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the communications devices may lie with the controlling node/central unit and/or the distributed units/TRPs. A communications device 14 is represented in FIG. 2 within the coverage area of the first communication cell 12. This communications device 14 may thus exchange signalling with the first central unit 40 in the first communication cell 12 via one of the distributed units 10 associated with the first communication cell 12.

It will further be appreciated that FIG. 2 represents merely one example of a proposed architecture for a new RAT based telecommunications system in which approaches in accordance with the principles described herein may be adopted, and the functionality disclosed herein may also be applied in respect of wireless telecommunications systems having different architectures.

Thus, certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 1 as shown in FIG. 1 which is adapted to provide functionality in accordance with the principles described herein, and in other examples the network infrastructure equipment may comprise a control unit/controlling node 40 and/or a TRP 10 of the kind shown in FIG. 2 which is adapted to provide functionality in accordance with the principles described herein.

Figure 3:
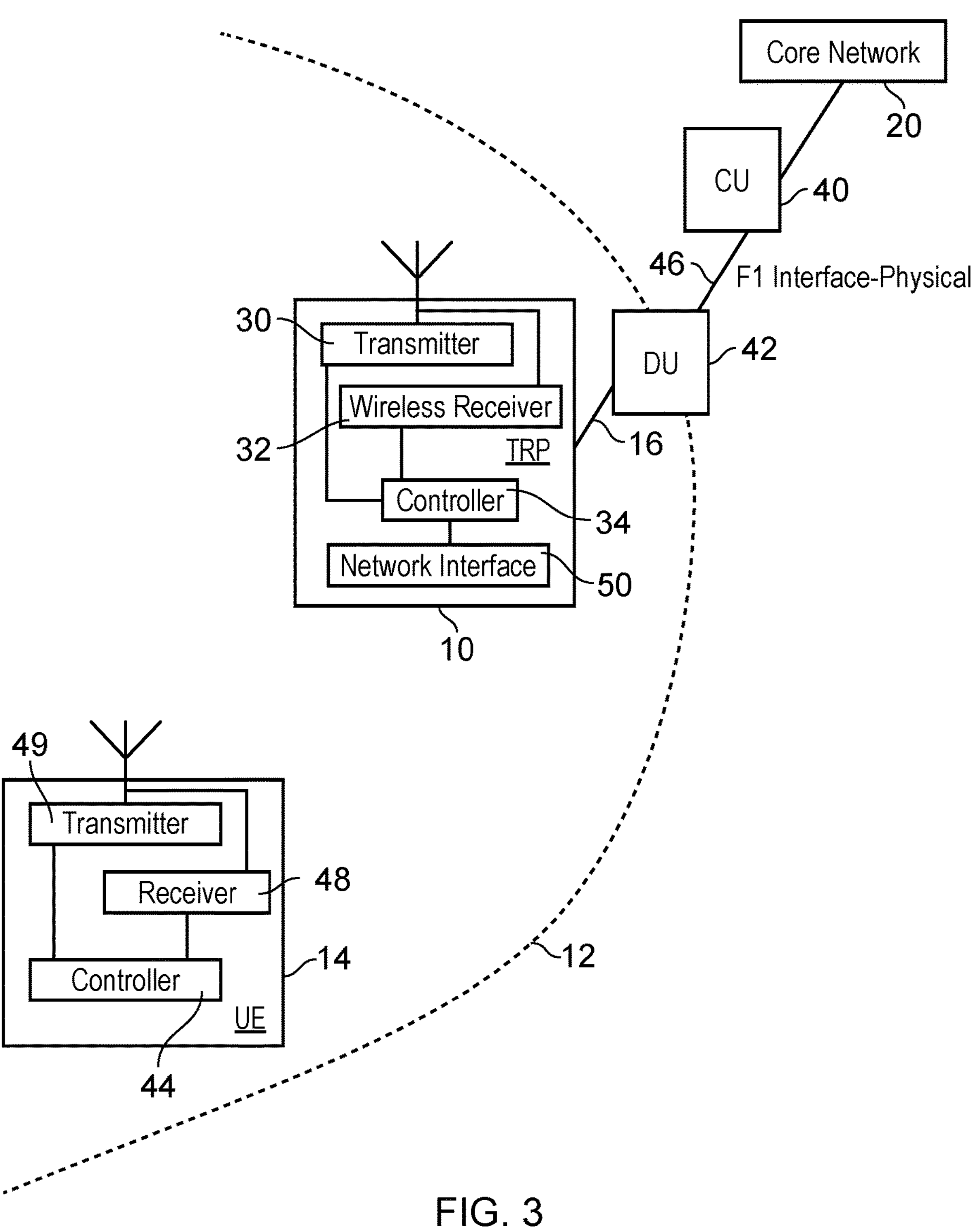
FIG. 3 is a schematic block diagram of some components of the wireless communications system shown in FIG. 2 in more detail in order to illustrate example embodiments of the present technique.

A more detailed diagram of some of the components of the network shown in FIG. 2 is provided by FIG. 3. In FIG. 3, a TRP 10 as shown in FIG. 2 comprises, as a simplified representation, a wireless transmitter 30, a wireless receiver 32 and a controller or controlling processor 34 which may operate to control the transmitter 30 and the wireless receiver 32 to transmit and receive radio signals to one or more UEs 14 within a cell 12 formed by the TRP 10. As shown in FIG. 3, an example UE 14 is shown to include a corresponding transmitter 49, a receiver 48 and a controller 44 which is configured to control the transmitter 49 and the receiver 48 to transmit signals representing uplink data to the wireless communications network via the wireless access interface formed by the TRP 10 and to receive downlink data as signals transmitted by the transmitter 30 and received by the receiver 48 in accordance with the conventional operation.

The transmitters 30, 49 and the receivers 32, 48 (as well as other transmitters, receivers and transceivers described in relation to examples and embodiments of the present disclosure) may include radio frequency filters and amplifiers as well as signal processing components and devices in order to transmit and receive radio signals in accordance for example with the 5G/NR standard. The controllers 34, 44, 48 (as well as other controllers described in relation to examples and embodiments of the present disclosure) may be, for example, a microprocessor, a CPU, or a dedicated chipset, etc., configured to carry out instructions which are stored on a computer readable medium, such as a non-volatile memory. The processing steps described herein may be carried out by, for example, a microprocessor in conjunction with a random access memory, operating according to instructions stored on a computer readable medium.

As shown in FIG. 3, the TRP 10 also includes a network interface 50 which connects to the DU 42 via a physical interface 16. The network interface 50 therefore provides a communication link for data and signalling traffic from the TRP 10 via the DU 42 and the CU 40 to the core network 20.

The interface 46 between the DU 42 and the CU 40 is known as the F1 interface which can be a physical or a logical interface. The F1 interface 46 between CU and DU may operate in accordance with specifications 3GPP TS 38.470 and 3GPP TS 38.473, and may be formed from a fibre optic or other wired high bandwidth connection. In one example the connection 16 from the TRP 10 to the DU 42 is via fibre optic. The connection between a TRP 10 and the core network 20 can be generally referred to as a backhaul, which comprises the interface 16 from the network interface 50 of the TRP 10 to the DU 42 and the F1 interface 46 from the DU 42 to the CU 40.

Bandwidth Parts (BWPs)

A communications device and an infrastructure equipment, such as the communications device 4 and infrastructure equipment 1 of FIG. 1 or the communications device 14 and infrastructure equipment (TRP) 10 of FIG. 2, are configured to communicate via a wireless access interface. The wireless access interface may comprise one or more carriers, each providing, within a range of carrier frequencies, communications resources for transmitting and receiving signals according to a configuration of the wireless access interface. The one or more carriers may be configured within a system bandwidth provided for the wireless communications network of which the infrastructure equipment 1, 10 forms part. Each of the carriers may be divided in a frequency division duplex scheme into an uplink portion and a downlink portion and may comprise one or more bandwidth parts (BWPs). A carrier may be configured therefore with a plurality of different BWP for a communications device to transmit or receive signals. The nature of the wireless access interface may be different amongst the different BWPs. For example, where the wireless access interface is based on orthogonal frequency division multiplexing, different BWPs may have different sub-carrier spacing, symbol periods and/or cyclic prefix lengths. BWPs may have different bandwidths.

By configuring BWPs appropriately, the infrastructure equipment may provide BWPs which are suited for different types of services. For example, a BWP more suitable for eMBB may have a larger bandwidth in order to support high data rates. A BWP suited for URLLC services may use a higher sub-carrier spacing and shorter slot durations, in order to permit lower latency transmissions. Parameters of the wireless access interface which are applicable to a BWP may be referred to collectively as the numerology of a BWP. Examples of such parameters are sub-carrier spacing, symbol and slot durations and cyclic prefix length.

Figure 4:
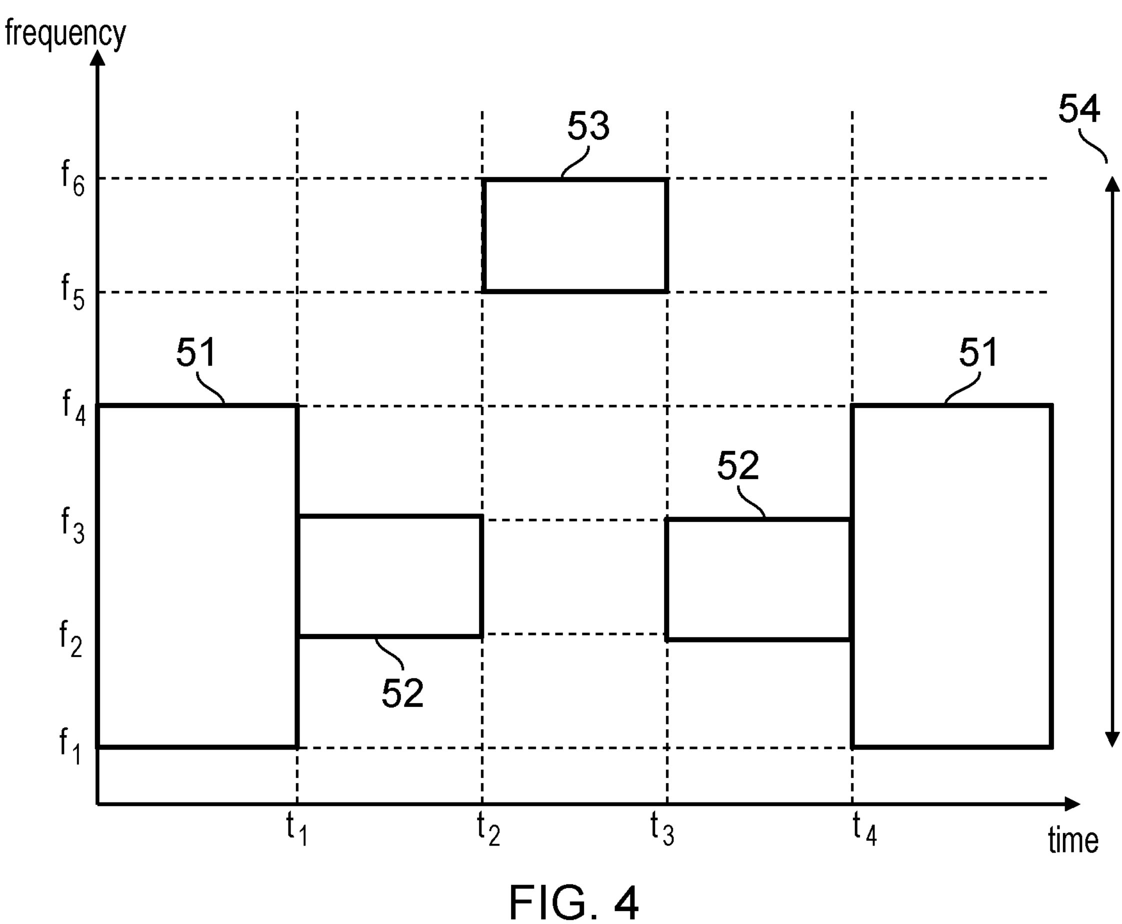
FIG. 4 illustrates a portion of a wireless access interface, in which the system bandwidth comprises multiple bandwidth parts (BWPs), in accordance with certain aspects of the present disclosure.

FIG. 4 shows an example of first to third BWPs 51, 52, 53 configured within a system bandwidth 54 extending from frequency f1 to frequency f6. Table 1 below provides a summary of the characteristics of each of the BWPs 51, 52, 53. As shown in Table 1, each BWP may be identified by an index number (bwp-id).

TABLE 1

Summary of BWP characteristics

| BWP | Index (bwp-id) | Frequency range | Sub-carrier spacing |
|---|---|---|---|
| 1101 | 1 | f1-f4 | 15 kHz |
| 1102 | 2 | f2-f3 | 15 kHz |
| 1103 | 3 | f5-f6 | 60 kHz |

In the example in FIG. 4, the BWPs 51, 52, 53 do not collectively span the entire system bandwidth 54. However, in some examples, the frequency range of one or more BWPs collectively spans the system bandwidth 54 (in other words, all frequencies in the system bandwidth may fall within at least one BWP). A frequency range of a BWP may be entirely within the frequency range of another BWP (in this case, the second BWP 52 is within the bandwidth of the first BWP 51).

A BWP may comprise communications resources for uplink or downlink communications. For a communications device, an uplink (UL) BWP and a downlink (DL) BWP may be independently configured, and an association (e.g. pairing) of an UL BWP and a DL BWP may be configured. In some examples, uplink and downlink communications resources are separated in time, in which case time division duplexing (TDD) may be used. In case of TDD, a BWP-pair (UL BWP and DL BWP with the same bwp-id) may have the same centre frequency. In some examples uplink and downlink communications resources are separated in frequency, in which case frequency division duplexing (FDD) may be used. Where FDD is used, a UL BWP and a DL BWP may comprise two non-contiguous frequency ranges, one comprising communications resources for uplink communications and one comprising communications resources for downlink communications. In the remainder of the present disclosure, the term 'bandwidth part' (BWP) is used to refer to a pair of associated uplink and downlink bandwidth parts and as such, may comprise communications resources for both uplink and downlink transmissions. The terms 'uplink bandwidth part' and 'downlink bandwidth part' will be used where appropriate to refer to a bandwidth part comprising only, respectively, uplink communications resources and downlink communications resources.

An activated BWP refers to a BWP which may be used for the transmission or reception of data to or from the communications device 4, 14. An infrastructure equipment 1, 10 may schedule transmissions to or by the communications device 4, 14 only on a BWP if that BWP is currently activated for the communications device 4, 14. On deactivated BWPs, the communications device 4, 14 may not monitor a Physical Downlink Control Channel (PDCCH) and may not transmit on the Physical Uplink Control Channel (PUCCH), the Physical Random Access Channel (PRACH) and the Uplink Shared Channel (UL-SCH).

Conventionally, as illustrated in FIG. 4, at most one BWP providing uplink communications resources and at most one BWP providing downlink communications resources may be activated at any given time in respect of a particular communications device. In the example of FIG. 4, initially (prior to time t1), only the first BWP 51 is activated. At time t1, the first BWP 51 is deactivated and the second BWP 52 is activated. Subsequently, at time t2, the second BWP 52 is deactivated. From t2 to t3, only the third BWP 53 is activated; from t3 to t4 only the second BWP 52 is activated, and at t4, the first BWP 51 is activated and the second BWP 52 is deactivated.

Initial, First Active and Default BWPs

A BWP may be designated as an initial downlink BWP, which provides the control resource set (CORESET) for downlink information used to schedule downlink transmissions of system information, and a corresponding initial uplink BWP for uplink transmissions for example for initiating PRACH transmission for initial access. When the communications device moves to connected mode, another BWP may be configured and activated as a first active BWP and then used for transmitting control information to or by the communications device 4, 14. The first active BWP can activate another configured BWP(s) if the first active BWP is unsuitable for an ongoing or new service or is insufficient e.g. due to congestion or lack of bandwidth. Alternatively or additionally, a BWP may be designated as a default BWP. If no BWP is explicitly configured as a default BWP, a BWP which is designated as the initial BWP may be the default BWP.

A default BWP may be defined as a BWP that a UE falls back to after an inactivity timer, associated with a BWP other than the default BWP, expires. For example, where a non-default BWP is deactivated as a result of an associated inactivity timer expiring, and no other non-default BWP is activated, then a default BWP may be activated in response.

BWPs in Known NR Implementations

Within a carrier bandwidth, a number of contiguous resource blocks can be grouped to form a bandwidth part (BWP) in NR. When a UE is operating in idle mode (e.g. the RRC_IDLE state) or inactive mode (e.g. the RRC_INACTIVE state), it has only one BWP that is broadcasted and configured by SIB1. However, when a UE moves to connected mode (e.g. RRC_CONNECTED), multiple BWPs (up to four BWPs within the carrier bandwidth) can be configured semi-statically in a UE-specific manner (i.e. via dedicated signalling). In spite of this, a UE monitors for and receives (or transmits) control and data signals within a single active BWP at any given time, amongst multiple BWPs.

The motivation of configuring a UE with more than one BWP while in connected mode is to reduce the power consumption at the UE by employing a Bandwidth Adaptation (BA) mechanism, meaning that when a UE has a large amount of data to receive and/or to transmit, a wide pipe of bandwidth is opened for it (i.e. a larger BWP is activated). Similarly, in the case of small data transmission/reception (i.e. low activity) a narrower BWP is used and activated.

Figure 5:
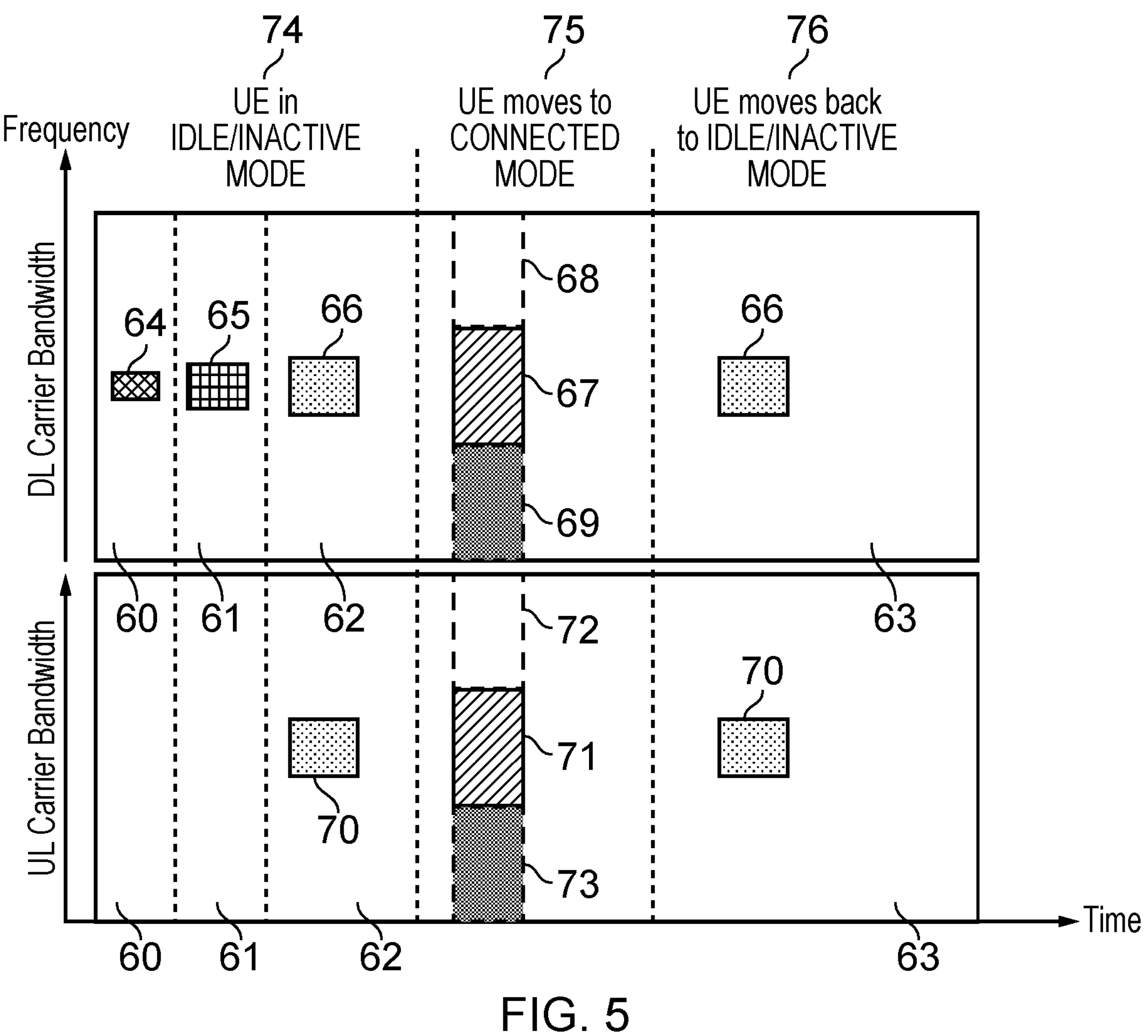
FIG. 5 illustrates known BWP configurations in NR for idle/inactive and connected modes.

In more detail as shown on FIG. 5, when a UE is in idle/inactive state 74, the UE receives in a synchronisation phase 60 the bandwidth of synchronisation signals (SS) and Physical Broadcast Channel (PBCH), where both are jointly termed as SSB 64. The SSB 64 bandwidth is fixed to 20 resource blocks (RBs). Once a UE detects the SS and decodes the PBCH received within the SSB 64, the UE knows the bandwidth of the control region known as Control Resource Set (CORESET) 65. Within the CORESET 65 bandwidth, the UE receives the first system information block (SIB1) in the SIB1 acquisition phase 61. SIB1 broadcasts and configures the initial BWPs 66, 70; both the DL initial BWP 66 and the UL initial BWP 70. These are either in a paired (i.e. Frequency Division Duplexing (FDD)) or an unpaired (i.e. Time Division Duplexing (TDD)) spectrum for all UEs, and are known as BWP #0 66, 70 (i.e. with index 0 for both DL 66 and UL 70 spectrum). The initial BWP 66, 70 must contain the SSB 64 and the entire CORESET #0 65 in the frequency domain. It is this BWP #0 66, 70 where a UE monitors paging when in idle/inactive mode in a paging monitoring and initial access phase 62. Hence, from this common BWP 66, 70, a UE can start initial access procedures, such as transmitting a PRACH in the uplink and receiving a Random Access Response (RAR) in the downlink. After a UE finishes initial access procedures, then the UE moves to the RRC connected state 75.

In the RRC connected state 75, the UE receives additional BWP configurations 67, 68, 69, 71, 72, 73 (up to 4 for each direction of DL and UL) in a UE-specific manner for the purposes of BWP adaptation. The numerology of each BWP 67, 68, 69, 71, 72, 73, such as subcarrier spacing, CP length, can be different than other configured BWPs 67, 68, 69, 71, 72, 73. The reason is that these different BWPs 67, 68, 69, 71, 72, 73 can be used for different services, e.g., eMBB, URLLC, or MBS.

As a single BWP (e.g. DL BWP #1 67 in the DL and UL BWP #1 71 in the UL) is activated at a given time in Rel-15/16, a UE can switch from one BWP to another BWP by means of RRC signalling, DCI, inactivity timer or upon initiation of random access. For the inactivity timer, the UE switches from the current active BWP 67, 71 to a default BWP as has been described above, and if the default BWP is not configured, the UE switches to the initial BWP 66, 70. Here, the UE moves back into the idle/inactive state 76, and again enters another paging monitoring and initial access phase 63. When a DCI is used for switching, the DCI is transmitted on the current active BWP 67, 71 but the content points to another BWP 68, 69, 72, 73; i.e. the DCI carries an index of the BWP 68, 69, 72, 73 to be activated as well as other scheduling information.

When a BWP is activated for a UE, the following actions are executed by the UE's MAC entity:

- Transmit on UL-SCH on the BWP;
- Transmit on Random Access Channel (RACH) on the BWP, if PRACH occasions are configured;
- Monitor PDCCH on the BWP;
- Transmit PUCCH on the BWP, if configured;
- Report Channel State Information (CSI) for the BWP;
- Transmit Sounding Reference Signals (SRS) on the BWP, if configured;
- Receive Downlink Shared Channel (DL-SCH) on the BWP; and
- Initialise/reinitialise any suspended configured uplink grants of Configured Grant (CG) Type 1 on the active BWP.

When a BWP is deactivated for a UE, the following actions are executed by the UE's MAC entity:

- Not transmit on UL-SCH on the BWP;
- Not transmit on RACH on the BWP, if PRACH occasions are configured;
- Not monitor the PDCCH on the BWP;
- Not transmit PUCCH on the BWP, if configured;
- Not report CSI for the BWP;
- Not transmit SRS on the BWP, if configured;
- Not receive DL-SCH on the BWP; and
- Suspend any configured uplink grants of CG Type 1 on the inactive BWP.

Further details of initial BWPs and additional configured BWPs for connected mode UEs can be found in the relevant art, for example in [11] and [12].

In Rel-17 NR, there are several areas of development, as described above. For example, one of these is small data transmission (SDT) [5]. The objective of SDT is to specify small data transmissions for a UE in INACTIVE state (i.e. without moving the UE to connected state) in order to reduce the signalling overhead as well as power consumption at the UE, primarily for the transmission of infrequent data traffic. The bandwidth part (BWP) used for SDT is mostly assumed to be the initial BWP (in both DL and UL) of the serving cell (PCell), although this has not been formally standardised at the date of filing of the present disclosure. However, it has been highlighted that the capacity of the initial BWP is very limited, and the collision probability between SDT and non-SDT random access (RA) would be increased. Hence it has been proposed that an additional BWP may be needed for SDT [6], [7], [8].

Another area of development in Rel-17 NR is Multicast and Broadcast Services (MBS) [9]. One objective for MBS is to define/configure common frequency resource(s) for a group of UEs to receive MBS at the same time (i.e. within the same scheduling instance, known as point-to-multipoint communication (P2MP)) in inactive/idle state. This common frequency resource can be also received by UEs in connected state, hence, therefore maximising the commonality between MBS scheduling for UEs in different states.

It has been agreed that, for RRC_IDLE/RRC_INACTIVE UEs, common frequency resource(s) should be defined/configured for group-common PDCCH/Physical Downlink Shared Channel (PDSCH). The UE may assume the initial BWP as the default common frequency resource for group-common PDCCH/PDSCH, if a specific common frequency resource is not configured. The relation of the common frequency resource(s) (if configured) and initial BWP, whether to configure one/more common frequency resources, and configuration and definition details of the common frequency resource have not yet been determined.

Some examples of how to configure common resources for MBS have been proposed in the art. Some such proposals are illustrated in FIGS. 6A, 6B, and 6C. The case shown in FIG. 6A ("case 1a") assumes that the common frequency resource is the initial BWP 81; that is MBS can be received by the group of UEs anywhere within the initial BWP. The case shown in FIG. 6C ("case 1c") indicates that the common frequency resource 86 is configured inside the initial BWP 85; that is the common frequency resource 86 is smaller and contained within the initial BWP 85. The case shown in FIG. 6B, ("case 1b") considers that the common frequency resource 83, 84 can be larger than the initial BWP 82, but may overlap the initial BWP 82. Case 1b as shown in FIG. 6B shows two similar realisations of configuring MBS frequency resources (i.e. Res #1 83 or Res #2 84) by not restricting the common resource within the initial BWP 82 in order to alleviate the capacity issue. It should be noted that the resource configurations of case 1a, 1b, and 1c (as shown in FIGS. 6A, 6B, and 6C) are not cell-specific; i.e. only a small group of UEs can use them.

A further area of development in Rel-17 NR concerns positioning enhancements for NR [10], for different UE states (i.e. connected/idle/inactive). Traditionally, positioning techniques are supported when a UE is in the connected state. However, it has been concluded in [10] that it is feasible for a UE to perform DL positioning measurement in either of the inactive or idle state. Consequently, it has been highlighted that studying how to support large bandwidth to transmit/receive the positioning reference signals (PRS) for better positioning accuracy should be carried out [13]. This implies that, if only the initial BWP is supported for PRS transmission (i.e. PRS Bandwidth), the accuracy of the measurement would not meet the target requirement. Hence a larger PRS bandwidth would be necessary [14].

As there are different services, such as SDT, MBS, and positioning, where each service may require a larger resource (i.e. larger than the initial BWP), an issue of how to support BWP adaptation for reducing the power consumption at the UE in inactive/idle mode presents itself. Furthermore, if each feature is specified independently, another issue may concern how to coordinate these resources from a power saving perspective.

The best solution could be one that provides a unified design, avoids fragmentation of configured resources for different services, and looks ahead for other potential needs (i.e. future releases such as positioning enhancements in Rel-18), while employing the BWP adaptation mechanism in idle/inactive mode. Embodiments of the present disclosure relate to such a solution.

BWP Adaptation for Idle and Inactive UEs

Figure 7:
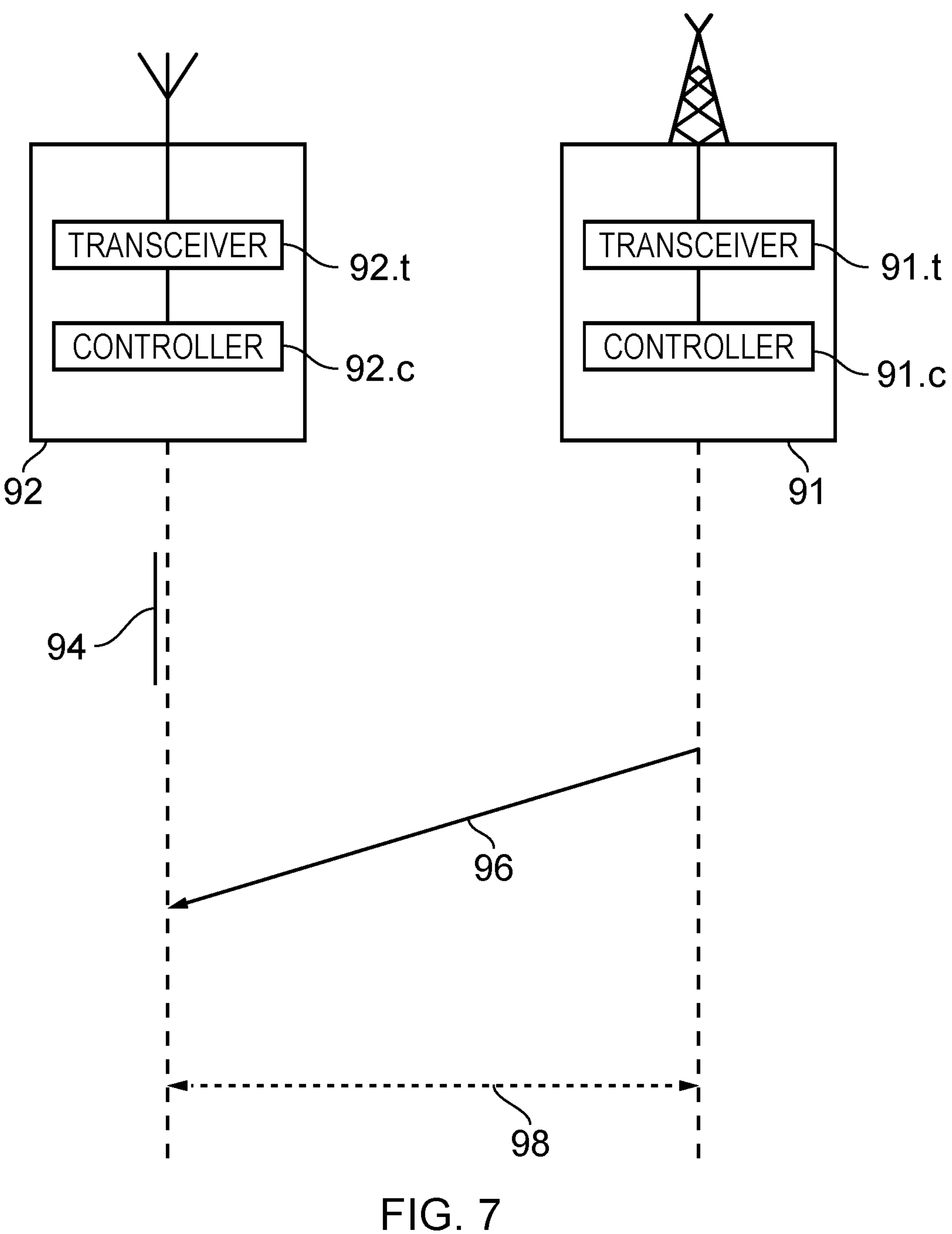
FIG. 7 is a part schematic representation, part message flow diagram of communications between a communications device and a wireless communications network in accordance with embodiments of the present technique.

FIG. 7 provides a part schematic representation, part message flow diagram of communications between a communications device or UE 92 and a wireless communications network in accordance with embodiments of the present technique. The wireless communications network may include an infrastructure equipment 91 which provides a cell having a coverage area within in one of which the communications device 92 may be located, or may enter in and out of. The communications device 92 comprises a transceiver (or transceiver circuitry) 92.*t* configured to transmit signals to or receive signals from the wireless communications network (for example, to the infrastructure equipment 91 via a wireless access interface provided by the wireless communications network), or indeed from other wireless communications networks, and a controller (or controller circuitry) 92.*c* configured to control the transceiver circuitry 92.*t* to transmit or to receive the signals. As can be seen in FIG. 7, the infrastructure equipment 91 may also comprise a transceiver (or transceiver circuitry) 91.*t*, which may be configured to transmit signals to or receive signals from the communications device 92 via the wireless access interface, and a controller (or controller circuitry) 91.*c*, which may be configured to control the transceiver circuitry 91.*t*, to transmit or to receive the signals. Each of the controllers 92.*c*, 91.*c* may be, for example, a microprocessor, a CPU, or a dedicated chipset, etc.

The controller circuitry 92.*c* of the communications device 92 is configured in combination with the transceiver circuitry 92.*t* of the communications device 92 to operate 94 in one of an idle state and an inactive state and, when operating 94 in the one of the idle state and the inactive state, to receive 96, via a broadcasted signal from the wireless communications network (e.g. from the infrastructure equipment 91), a configuration of at least two bandwidth parts, BWPs, for use by the communications device 92 in transmitting signals to 98 and/or receiving signals from 98 the wireless communications network (e.g. to and/or from the infrastructure equipment 91) while remaining in the one of the idle state and the inactive state 94, wherein radio resources forming a first of the BWPs at least partially overlap in both frequency and time with radio resources forming a second of the BWPs, and wherein the first BWP and the second BWP have a same numerology.

In at least some arrangements of embodiments of the present disclosure, the first BWP may have a narrower bandwidth than the second BWP. In at least some arrangements of embodiments of the present disclosure, the radio resources of the first BWP are fully contained within the radio resources of the second BWP, rather than merely overlapping them.

Essentially, embodiments of the present technique propose a BWP adaptation mechanism for idle and inactive mode UEs where a network configures at least two cell-specific BWPs comprising at least a narrower initial BWP and a wider BWP where the wider BWP includes (i.e. overlaps with) the resource of the narrower initial BWP and both have the same numerology. As described above, the numerology of a BWP refers to those parameters of the wireless access interface which are applicable to the BWP, and include sub-carrier spacing, symbol and slot durations and cyclic prefix length.

In some arrangements of embodiments of the present disclosure, for the BWP adaptation, a UE can receive and or transmit some services (i.e. a first group of services) such as paging and initial access on the initial narrower BWP, and at the same time can receive or transmit some other services (i.e. a second group of services) such as SDT, MBS and Positioning on a wider BWP. In other words, the communications device is configured to transmit to and/or receive from the wireless communications network, within the radio resources of the first BWP, data associated with a first group of services (e.g. system information, paging, and initial access), and/or to transmit to and/or receive from the wireless communications network (e.g. to or from an infrastructure equipment of the wireless communications network), within the radio resources of the second BWP, data associated with a second group of services (e.g. small data transmission, SDT, multicast and broadcast services, MBS, and positioning) which are different from the first group of services, wherein data associated with the first group of services can be transmitted and/or received within the radio resources of the first BWP at the same time as data associated with the second group of services is transmitted and/or received within the radio resources of the second BWP.

In some arrangements of embodiments of the present disclosure, when a UE does not have an active transmission and or reception of the second group of services for a period of time in the wider BWP, the UE falls back to the initial narrower BWP (i.e. RF is limited to the initial BWP). In other words, the communications device is configured to determine that the communications device is to stop transmitting and/or receiving the data associated with the at least one of the second group of services within the radio resources of the second BWP, and that the communications device is to transmit and/or receive data associated with at least one of the first group of services within the radio resources of the first BWP. Here, the determination may be made by the communications device based on the communications device not having transmitted or received any data associated with the at least one of the second group of services within the radio resources of the second BWP for a predetermined period of time.

In some arrangements of embodiments of the present disclosure, the time period can be implemented as a timer such as inactivity timer. This timer can be started/restarted whenever a UE receives or transmits control data such as DCI/PUCCH or user data such as PDSCH/Physical Uplink Shared Channel (PUSCH) or reference signals such PRS/SRS. This inactivity timer is different from a failure timer (which is described further below) that may be specified for cell selection/reselection due to a connection failure such as beam failure.

Regarding the first group of services, they can be defined as a set of features that are confined to be received/transmitted by the UE on the narrower BWP, such as system information, paging and initial access (e.g. PRACH, RAR, message 3/4, MsgA and MsgB as would be understood by those skilled in the art). The first group of services includes the features supported by legacy UEs (Rel-15/16) in idle and inactive states. Regarding the second group of services, they can be defined as a set of features that are specified for Rel-17 and beyond, and are configured/allowed to be received/transmitted by the UE on the wider BWP (in addition to the narrower BWP). Such services include SDT, MBS and positioning.

Figure 8:
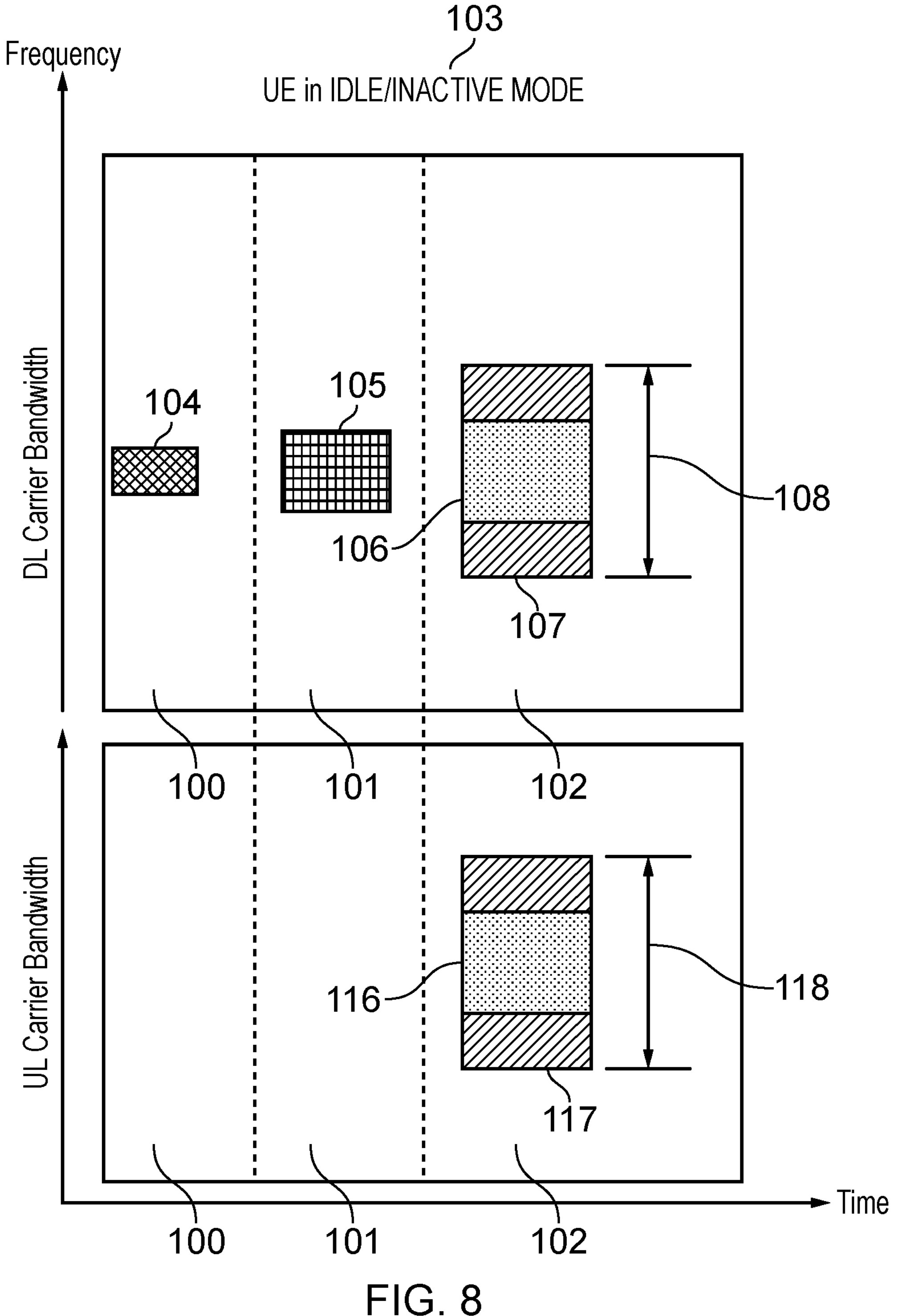
FIG. 8 shows an example of BWP adaptation between initial BWPs #0A and #0B for UEs in an idle or an inactive state in accordance with embodiments of the present technique.

FIG. 8 shows an example of BWP adaptation between initial BWPs #0A and #0B for a UE in an idle or an inactive state 103 in accordance with embodiments of the present technique. As shown in FIG. 8, after a UE acquires the synchronisation via SSB 104 in a synchronisation phase 100, and receives SIB1 within the CORESET bandwidth 105 in a SIB1 acquisition phase 101, the UE enters a phase 103 in which it is able to perform paging monitoring, random access, SDT, MBS, positioning, etc. In this phase 103, the UE is configured to receive on the DL and/or transmit on the UL on the initial BWP #0A 106, 116 and BWP #0B 108, 118 at the same time. In this example as shown in FIG. 8, BWP #0A 106, 116 can be the legacy initial BWP while BWP #0B 108, 118 is a wider BWP that overlaps the BWP #0A 106, 116 with extra initial bandwidth 107, 117. Both BWP #0A 106, 116 and BWP #0B 108, 118 (in both the DL and UL) both have the same numerology. As the skilled person would understand, and as shown in FIG. 5 for example and discussed previously above (but not shown in FIG. 8), the UE may move from the idle/inactive state to a connected state upon performing an initial/random access procedure. In this connected state, the UE may receive additional BWP configurations in a UE-specific manner for the purposes of BWP adaptation. The numerologies may be different for these additional BWP configurations.

UEs which are capable of transmitting and/or receiving services from the second group of services (e.g. SDT, MBS, positioning) can receive/transmit on the wider BWP. In other words, the capability of supporting the wider BWP depends on whether a UE is capable of at least one of this second group of services. The usage of the extra wider BWP further depends on the existence of at least one of these services (from the second group) in the cell, and hence the configuration of the extra wider BWP can be broadcasted either on SIB1 or on feature-specific SIBs (e.g. a SIB specific for MBS or SDT or positioning). In order to achieve a unified design and avoid multiple configurations from different SIBs, it is preferable that the configuration is provided by only SIB1 and as a prerequisite for other features, such that these other features can only be supported if the wider BWP is configured by SIB1 first for idle and inactive mode UEs. This means that SIB1 must be extended and configured at least two initial BWPs; the narrower initial BWP (termed herein the "first BWP") and the wider BWP (termed herein the "second BWP").

Figure 9A:
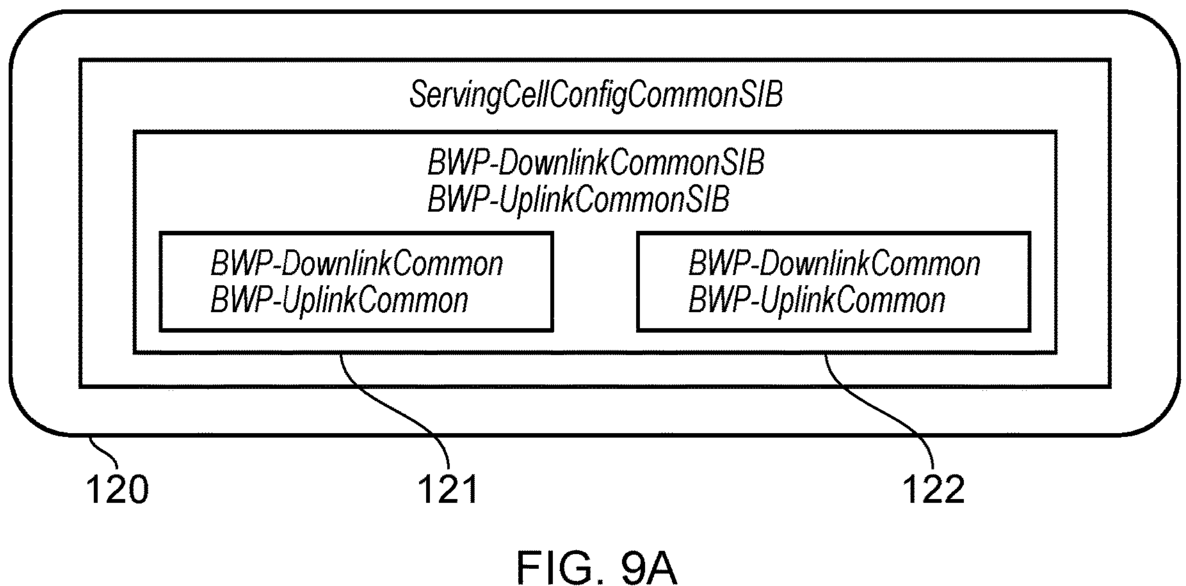
FIGS. 9A and 9B show examples of a configuration of multiple BWPs for inactive and idle UEs in accordance with embodiments of the present technique.
Figure 9B:
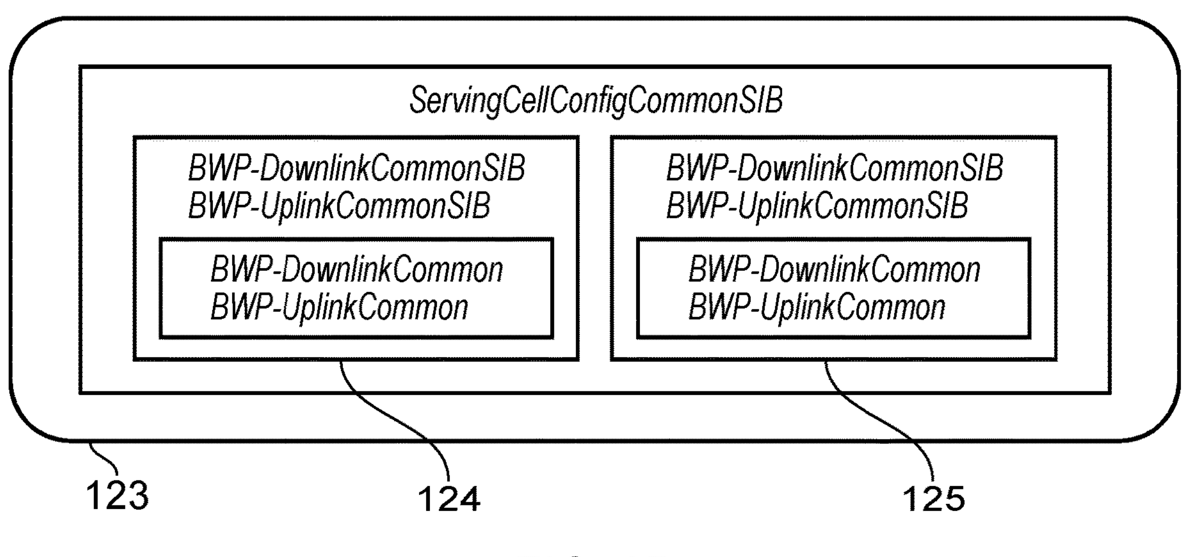

FIGS. 9A and 9B each show an example of a configuration, by an extended SIB1, of multiple BWPs for inactive and idle UEs in accordance with embodiments of the present technique. For example, as shown by FIG. 9A, the SIB1 120 extension may be implemented within BWP-DownlinkCommonSIB and BWP-UplinkCommonSIB in the ServingCellConfigCommonSIB where the BWP-DownlinkCommonSIB contains two configurations of BWP-DownlinkCommon, one for BWP #0A 121 and another for BWP #0B 122, and the BWP-UplinkCommonSIB includes two configurations of BWP-Uplink Common, one for BWP #0A 121 and another for BWP #0B 122. Another example is shown in FIG. 9B, where the SIB1 123 extension is realised within the ServingCellConfigCommonSIB, and two branches are configured, one each for BWP #0A 124 and BWP #0B 125, where each branch comprises BWP-DownlinkCommonSIB and BWP-UplinkCommonSIB.

For the legacy BWP #0A, the BWP-DownlinkCommon should at least contain the configuration of cell specific parameters for downlink control and data: pdcch-ConfigCommon and pdsch-ConfigCommon. Similarly, the BWP-UplinkCommon includes the configuration of cell specific parameters for uplink control and data; rach-ConfigCommon, pucch-ConfigCommon and pusch-ConfigCommon. Further details, which would be understood by those skilled in the art, may be found in [15]. However, for the new BWP #0B, although some of these configurations on BWP #0A may still be needed, some additional feature specific configurations may also be added. For example, for positioning, a PRS configuration within BWP #0B would be necessary. It should also be possible to configure only one uplink BWP, meaning that both downlink configurations of BWP-DownlinkCommon would be linked to the same BWP-UplinkCommon. A UE that does not support the wider BWP, or one that supports only a single initial BWP, would take no action for the configuration of the wider BWP.

In some arrangements of embodiments of the present technique, from the network's perspective, the scheduling of the second group of services can be dynamic scheduling, either with group or UE-specific scheduling. A UE can receive a DCI indication (e.g. a UE-specific DCI or Group common DCI, for example for MBS) from the network to move to the wider BWP to receive or transmit one of the second group of services such as SDT or MBS. In other words, the communications device is configured to receive, from the wireless communications network (e.g. from the infrastructure equipment), a downlink control information, DCI, indicator, the DCI indicator indicating that the communications device is to transmit and/or receive data associated with at least one of the second group of services within the radio resources of the second BWP. This DCI indicator may be a group common DCI indicator which is further received from the wireless communications network by one or more other communications devices. In some arrangements of embodiments of the present disclosure, the DCI indicator indicates that the communications device is to receive control information (e.g. via a Multicast Control Channel (MCCH)) for the data associated with the at least one of the second group of services (e.g. MBS) within the radio resources of the first BWP before transmitting and/or receiving the data (e.g. via a Multicast Traffic Channel (MTCH)) associated with the at least one of the second group of services within the radio resources of the second BWP in accordance with the control information. Alternatively, the control information and data indicated by the DCI indicator may each be received by the communications device, respectively in the resources of the first BWP and the resources of the second BWP, as part of a RAR message from the wireless communications network (e.g. from the infrastructure equipment).

Figure 10:
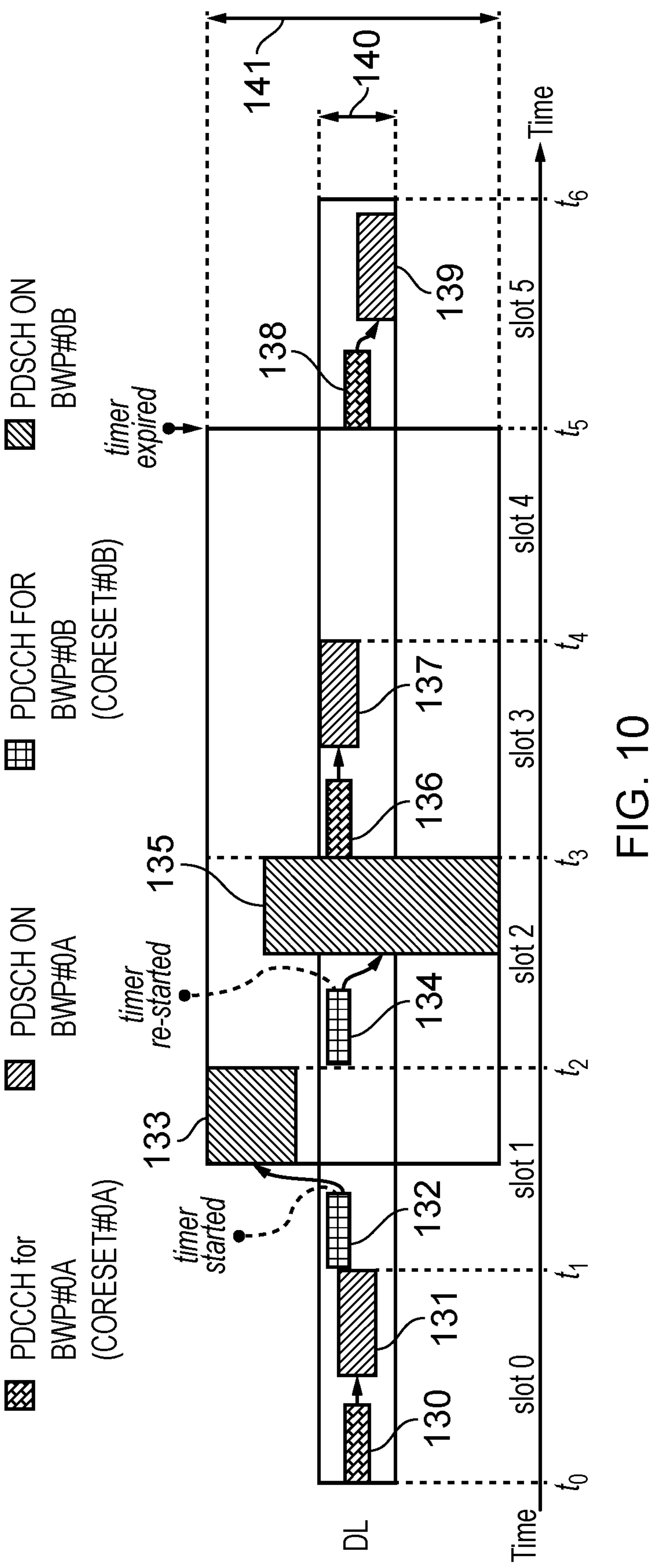
FIG. 10 illustrates an example of dynamic scheduling on each of a narrow BWP and a wider BWP in accordance with embodiments of the present technique.

FIG. 10 illustrates an example of such dynamic scheduling on each of a narrow BWP 140 and a wider BWP 141 in accordance with embodiments of the present technique. DCIs 130, 136, 138 each schedule PDSCHs 131, 137, 139 respectively on the narrower initial BWP 140, whereas DCIs 132, 134 schedule PDSCHs 133, 135 respectively on the wider BWP 141. When the UE receives the first DCI 132 scheduling on the wider BWP 141, the UE starts an inactivity timer. In this case as shown in FIG. 10, before the timer has expired, the UE receives a second DCI 134 that schedules PDSCH 135, and hence the UE restarts the timer. However, the timer expires at a later point at time $t_5$ without a further PDSCH being scheduled on the winder BWP 141, and as a result, the UE subsequently falls back to monitoring the narrower BWP 140. Hence, the UE reduces its power consumption by employing BWP adaptation when operating in an idle or an inactive state.

In some arrangements of embodiments of the present technique, from the network's perspective, the scheduling of the second group of services can also be done by using periodic or semi-persistent scheduling (i.e. SPS and CG), such as the scheduling of MBS or positioning reference signals (i.e. PRS, SRS). A UE may autonomously move to the wider BWP knowing that there is a periodic scheduling of data for reception/transmission. The UE may return to the narrower initial BWP in accordance with the periodicity, or may only shrink back to the narrower initial BWP when an inactivity timer expires in the same manner as described for the example of FIG. 10 above. In other words, the communications device is configured to determine that the communications device is to transmit and/or receive the data associated with the at least one of the second group of services within the radio resources of the second BWP periodically in accordance with a periodic scheduling of the data associated with the at least one of the second group of services.

Figure 11:
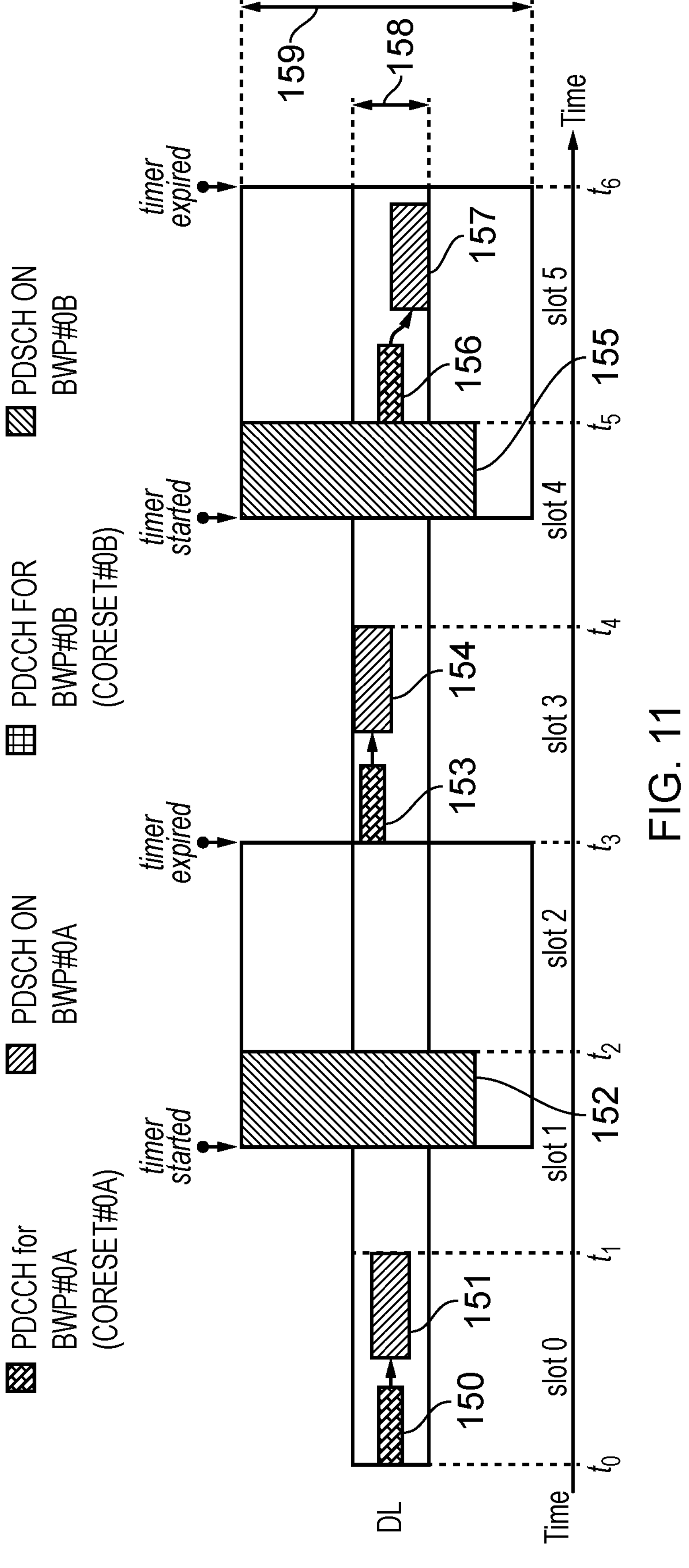
FIG. 11 illustrates an example of dynamic scheduling on a narrow BWP and periodic scheduling on a wider BWP in accordance with embodiments of the present technique.

FIG. 11 illustrates another example of dynamic scheduling on a narrow BWP 158 and periodic scheduling on a wider BWP 159 in accordance with embodiments of the present technique. The example illustrated by FIG. 11 is similar to the example shown by FIG. 10, but in addition, it shows periodic semi-persistent scheduling (SPS) on the wider BWP 159, such as for an MBS service. When a UE receives a first PDSCH 152 within one of the periodic occasions of the wider BWP 159, the UE starts an inactivity timer. This timer expires at a later point at time $t_3$, and as a result, the UE falls back to monitoring the narrower BWP 158 until the next periodic occasion. Hence, the UE is again able to reduce its power consumption by employing BWP adaptation in an idle or an inactive state.

Another way of implementing the power saving mechanism for periodic traffic, in accordance with at least some arrangements of embodiments of the present disclosure, is to configure discontinuous reception (DRX) that matches the periodic traffic pattern on the wider BWP. Hence, a UE wakes up during the "ON" periods of the DRX cycle in order to receive the PDCCH/PDSCH/PUSCH, and then goes back to sleep immediately. In other words, the predetermined period of time is determined by the communications device to have elapsed in accordance with a discontinuous reception, DRX, mode of operation of the communications device. Such an implementation is particularly suitable for MBS and positioning services.

It should be noted that as the wider BWP includes (i.e. overlaps with) the resource of the narrower initial BWP, and these BWPs have the same numerology, a UE can receive both BWPs at the same time by employing only the radio frequency (RF) of the wider BWP. The overlapping between the narrower and wider BWPs is a particularly important characteristic of the design proposed by embodiments of the present disclosure, as a UE operating in an idle or an inactive mode will always receive (and thus not miss) at least the system information and paging channel transmitted on the narrower initial BWP. In some arrangements of embodiments of the present technique, in the case where two different DRX operations are configured, e.g. one for the narrower initial BWP and another for the wider BWP, a UE can adopt each DRX separately, or work out a third DRX based on combination of the DRXs, e.g. by employing an OR operator.

It is possible to reuse the existing CORESET0 for scheduling on both the narrower and wider BWPs. However, in order to increase the capacity, some arrangements of embodiments of the present technique may provide an additional control resource set (e.g. CORESET0B) which can be configured for UEs operating in an idle or an inactive mode to receive the control channel (PDCCH) for the second group of services (as shown and discussed previously with respect to FIGS. 10 and 11). In other words, the communications device is configured to receive receiving, from the wireless communications network, a configuration of a control resource set, CORESET, the CORESET being specific to the second group of services and being for use by the communications device in receiving a control channel for at least one of the second group of services. This new CORESET is configured by SIB1 or feature-specific SIBs (e.g. a SIB specific for MBS or SDT or positioning).

In at least some arrangements of embodiments of the present disclosure, this new CORESET must be confined within the narrower BWP so that a UE is able to receive DCIs even when the UE is monitoring only the narrower initial BWP. In other words, the CORESET is located within the radio resources of the first BWP. Within the new CORESET, a number of search spaces can be configured depending on how many different services are to be received. For example, a search space for monitoring a group common DCI may be specified for MBS, and/or a different search space may be configured for SDT monitoring, etc. In other words, the communications device is configured to receive, from the wireless communications network, an indication of one or more search spaces within the CORESET, each of the one or more search spaces being associated with one of the second group of services and being for monitoring by the communications device for a control channel for the associated one of the second group of services. If the new or additional CORESET is not configured, a UE must assume it is to monitor the legacy CORESET0 for both the first and second groups of services.

In order to increase the capacity for SDT, a separate PRACH resource for 4-step RACH can be configured on the wider BWP. By the same token, if supported, a separate MSG1 resource (PRACH+PUSCH) for 2-step RACH can be configured on the wider BWP. After a UE has transmitted a PRACH preamble for a 4-step RACH procedure or a MSG1 for a 2-step RACH procedure, a UE monitors a RAR/MSGB response in the downlink. That is, a DCI transmitted on the downlink of the narrow BWP may indicate to a UE that it is to receive a PDSCH or transmit a PUSCH either on the wider BWP or on the narrower BWP.

In some cases, if a UE transmits an uplink message, such as SDT, the downlink response may not be available on time or may be lost for fairly standard reasons such as beam failure or the like. For SDT, a new failure timer has been specified that can be started/restarted whenever a UE receives or transmits a message in the initial BWP. If the failure timer expires, a UE enters RRC idle and starts cell reselection. This mechanism of failure timer can be reused by arrangements of embodiments of the present disclosure whenever a UE receives or transmits a message in the narrower BWP or wider BWP. As mentioned above, it should be appreciated by those skilled in the art that this failure timer is not same as the inactivity timer used for the wider BWP as shown in and described with respect to the examples of FIGS. 10 and 11. It may be assumed that the failure timer is much longer than the inactivity timer associated with the wider BWP as the failure timer is intended to handle connection failure from the network due to, for example, a beam failure.

Those skilled in the art would appreciate that, where reference in the present disclosure has been made to the "wider BWP", such a BWP may be understood to be a common frequency resource which may be configured for UEs which receive MBS, positioning features and the like in idle and/or inactive states. However, regardless of terminology, the movement of a UE between a narrow BWP and a wider BWP/common frequency resource to transmit/receive data of different services whilst remaining in an idle or an inactive mode as proposed by embodiments of the present disclosure, and which is not known in the relevant art, allows for the increased capacity of resources for such UEs, whilst allowing power saving to be achieved at the UE.

Flow Diagram Representation

Figure 12:
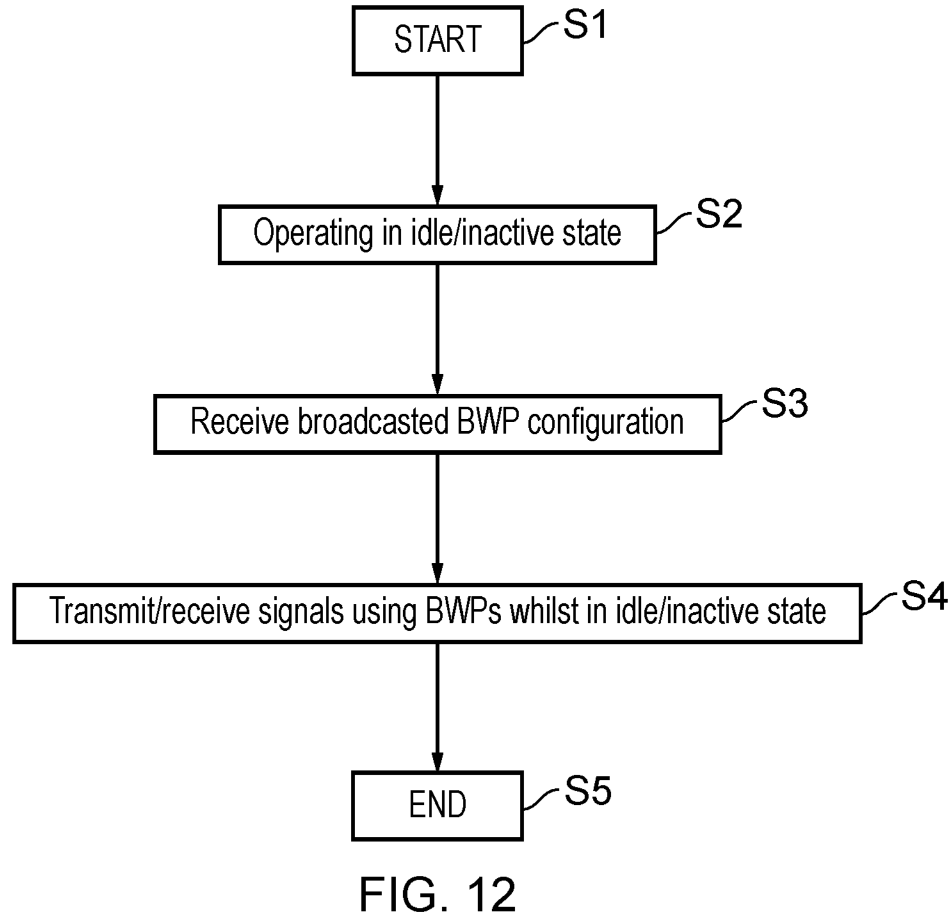
FIG. 12 shows a flow diagram illustrating a method of operating a communications device in accordance with embodiments of the present technique.

FIG. 12 shows a flow diagram illustrating a method of operating a communications device configured to transmit signals to and/or to receive signals from a wireless communications network. The method begins in step S1. The method comprises, in step S2, operating in one of an idle state and an inactive state and, when operating in the one of the idle state and the inactive state. In step S3, the method comprises receiving, via a broadcasted signal from the wireless communications network, a configuration of at least two bandwidth parts, BWPs, for use by the communications device in transmitting signals to and/or receiving signals from the wireless communications network while remaining in the one of the idle state and the inactive state. The process then comprises, in step S4, transmitting the signals to and/or receiving the signals from the wireless communications network while remaining in the one of the idle state and the inactive state. Radio resources forming a first of the BWPs at least partially overlap in both frequency and time with radio resources forming a second of the BWPs. The first BWP and the second BWP have a same numerology. The process ends in step S5.

Those skilled in the art would appreciate that the example method shown by FIG. 12 and example system shown in FIG. 7 and described with respect to the arrangements illustrated by FIGS. 8 to 11 may be adapted in accordance with embodiments of the present technique. For example, other intermediate steps may be included in such methods or systems, or the steps may be performed in any logical order.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present disclosure.

The following numbered paragraphs provide further example aspects and features of the present technique:

Paragraph 1. A method of operating a communications device configured to transmit signals to and/or to receive signals from a wireless communications network, the method comprising operating in one of an idle state and an inactive state and, when operating in the one of the idle state and the inactive state, receiving, via a broadcasted signal from the wireless communications network, a configuration of at least two bandwidth parts, BWPs, for use by the communications device in transmitting signals to and/or receiving signals from the wireless communications network while remaining in the one of the idle state and the inactive state, wherein radio resources forming a first of the BWPs at least partially overlap in both frequency and time with radio resources forming a second of the BWPs, and wherein the first BWP and the second BWP have a same numerology.

Paragraph 2. A method according to Paragraph 1, wherein the first BWP has a narrower bandwidth than the second BWP.

Paragraph 3. A method according to Paragraph 1 or Paragraph 2, wherein the radio resources of the first BWP are fully contained within the radio resources of the second BWP.

Paragraph 4. A method according to any of Paragraphs 1 to 3, comprising transmitting to and/or receiving from the wireless communications network, within the radio resources of the first BWP, data associated with a first group of services, and/or transmitting to and/or receiving from the wireless communications network, within the radio resources of the second BWP, data associated with a second group of services which are different from the first group of services, wherein data associated with the first group of services can be transmitted and/or received within the radio resources of the first BWP at the same time as data associated with the second group of services is transmitted and/or received within the radio resources of the second BWP.

Paragraph 5. A method according to Paragraph 4, wherein the first group of services comprises system information, paging, and initial access, and wherein the second group of services comprises small data transmission, SDT, multicast and broadcast services, MBS, and positioning.

Paragraph 6. A method according to Paragraph 4 or Paragraph 5, comprising determining that the communications device is to transmit and/or receive data associated with at least one of the second group of services within the radio resources of the second BWP.

Paragraph 7. A method according to Paragraph 6, comprising receiving, from the wireless communications network, a downlink control information, DCI, indicator, and determining that the communications device is to transmit and/or receive the data associated with the at least one of the second group of services within the radio resources of the second BWP based on the DCI indicator.

Paragraph 8. A method according to Paragraph 7, wherein the DCI indicator indicates that the communications device is to receive control information for the data associated with the at least one of the second group of services within the radio resources of the first BWP before transmitting and/or receiving the data associated with the at least one of the second group of services within the radio resources of the second BWP in accordance with the control information.

Paragraph 9. A method according to Paragraph 7 or Paragraph 8, wherein the DCI indicator is a group common DCI indicator which is further received from the wireless communications network by one or more other communications devices.

Paragraph 10. A method according to any of Paragraphs 6 to 9, comprising determining that the communications device is to transmit and/or receive the data associated with the at least one of the second group of services within the radio resources of the second BWP periodically in accordance with a periodic scheduling of the data associated with the at least one of the second group of services.

Paragraph 11. A method according to any of Paragraphs 6 to 10, comprising determining that the communications device is to stop transmitting and/or receiving the data associated with the at least one of the second group of services within the radio resources of the second BWP, and that the communications device is to transmit and/or receive data associated with at least one of the first group of services within the radio resources of the first BWP.

Paragraph 12. A method according to Paragraph 11, wherein the determination is made by the communications device based on the communications device not having transmitted or received any data associated with the at least one of the second group of services within the radio resources of the second BWP for a predetermined period of time.

Paragraph 13. A method according to Paragraph 12, wherein the predetermined period of time is determined by the communications device to have elapsed based on the expiry of an inactivity timer.

Paragraph 14. A method according to Paragraph 12 or Paragraph 13, wherein the predetermined period of time is determined by the communications device to have elapsed in accordance with a discontinuous reception, DRX, mode of operation of the communications device.

Paragraph 15. A method according to any of Paragraphs 4 to 14, comprising receiving, from the wireless communications, a configuration of a control resource set, CORESET, the CORESET being specific to the second group of services and being for use by the communications device in receiving a control channel for at least one of the second group of services.

Paragraph 16. A method according to Paragraph 15, wherein the CORESET is located within the radio resources of the first BWP.

Paragraph 17. A method according to Paragraph 15 or Paragraph 16, comprising receiving, from the wireless communications network, an indication of one or more search spaces within the CORESET, each of the one or more search spaces being associated with one of the second group of services and being for monitoring by the communications device for a control channel for the associated one of the second group of services.

Paragraph 18. A communications device comprising transceiver circuitry configured to transmit signals to and/or to receive signals from wireless communications networks, and controller circuitry configured in combination with the transceiver circuitry to operate in one of an idle state and an inactive state and, when operating in the one of the idle state and the inactive state, to receive, via a broadcasted signal from the wireless communications network, a configuration of at least two bandwidth parts, BWPs, for use by the communications device in transmitting signals to and/or receiving signals from the wireless communications network while remaining in the one of the idle state and the inactive state, wherein radio resources forming a first of the BWPs at least partially overlap in both frequency and time with radio resources forming a second of the BWPs, and wherein the first BWP and the second BWP have a same numerology.

Paragraph 19. Circuitry for a communications device comprising transceiver circuitry configured to transmit signals to and/or to receive signals from wireless communications networks, and controller circuitry configured in combination with the transceiver circuitry to operate in one of an idle state and an inactive state and, when operating in the one of the idle state and the inactive state, to receive, via a broadcasted signal from the wireless communications network, a configuration of at least two bandwidth parts, BWPs, for use by the communications device in transmitting signals to and/or receiving signals from the wireless communications network while remaining in the one of the idle state and the inactive state, wherein radio resources forming a first of the BWPs at least partially overlap in both frequency and time with radio resources forming a second of the BWPs, and wherein the first BWP and the second BWP have a same numerology.

Paragraph 20. A method of operating an infrastructure equipment forming part of a wireless communications network and configured to transmit signals to and/or to receive signals from communications devices, the method comprising transmitting, via a broadcasted signal receivable by at least one of the communications devices which is operating in one of an idle state and an inactive state, a configuration of at least two bandwidth parts, BWPs, for use by the infrastructure equipment in transmitting signals to and/or receiving signals from the at least one communications device while the at least one communications device is operating in the one of the idle state and the inactive state, wherein radio resources forming a first of the BWPs at least partially overlap in both frequency and time with radio resources forming a second of the BWPs, and wherein the first BWP and the second BWP have a same numerology.

Paragraph 21. A method according to Paragraph 20, wherein the first BWP has a narrower bandwidth than the second BWP.

Paragraph 22. A method according to Paragraph 20 or Paragraph 21, wherein the radio resources of the first BWP are fully contained within the radio resources of the second BWP.

Paragraph 23. A method according to any of Paragraphs 20 to 22, comprising transmitting to and/or receiving from the at least one communications device, within the radio resources of the first BWP, data associated with a first group of services, and/or transmitting to and/or receiving from the at least one communications device, within the radio resources of the second BWP, data associated with a second group of services which are different from the first group of services, wherein data associated with the first group of services can be transmitted and/or received within the radio resources of the first BWP at the same time as data associated with the second group of services is transmitted and/or received within the radio resources of the second BWP.

Paragraph 24. A method according to Paragraph 23, wherein the first group of services comprises system information, paging, and initial access, and wherein the second group of services comprises small data transmission, SDT, multicast and broadcast services, MBS, and positioning.

Paragraph 25. A method according to Paragraph 23 or Paragraph 24, comprising transmitting, to the at least one communications device, a downlink control information, DCI, indicator, the DCI indicator indicating that the at least one communications device is to transmit and/or receive data associated with at least one of the second group of services within the radio resources of the second BWP.

Paragraph 26. A method according to Paragraph 25, wherein the DCI indicator indicates that the infrastructure equipment is to transmit, to the at least one communications device, control information for the data associated with the at least one of the second group of services within the radio resources of the first BWP before transmitting and/or receiving by the at least one communications device the data associated with the at least one of the second group of services within the radio resources of the second BWP in accordance with the control information.

Paragraph 27. A method according to Paragraph 25 or Paragraph 26, wherein the DCI indicator is a group common DCI indicator, and wherein the method comprises transmitting the DCI indicator to one or more others of the communications devices in addition to the at least one communications device.

Paragraph 28. A method according to any of Paragraphs 23 to 27, comprising determining that the infrastructure equipment is to transmit and/or receive data associated with at least one of the second group of services within the radio resources of the second BWP periodically in accordance with a periodic scheduling of the data associated with the at least one of the second group of services.

Paragraph 29. A method according to any of Paragraphs 23 to 28, comprising transmitting, to the at least one communications device, a configuration of a control resource set, CORESET, the CORESET being specific to the second group of services and being for use by the infrastructure equipment in transmitting to the at least one communications device a control channel for at least one of the second group of services.

Paragraph 30. A method according to Paragraph 29, wherein the CORESET is located within the radio resources of the first BWP.

Paragraph 31. A method according to Paragraph 29 or Paragraph 30, comprising transmitting to the at least one communications device an indication of one or more search spaces within the CORESET, each of the one or more search spaces being associated with one of the second group of services and being for monitoring by the at least one communications device for a control channel for the associated one of the second group of services.

Paragraph 32. An infrastructure equipment forming part of a wireless communications network, the infrastructure equipment comprising transceiver circuitry configured to transmit signals to and/or to receive signals from communications devices, and controller circuitry configured in combination with the transceiver circuitry to transmit, via a broadcasted signal receivable by at least one of the communications devices which is operating in one of an idle state and an inactive state, a configuration of at least two bandwidth parts, BWPs, for use by the infrastructure equipment in transmitting signals to and/or receiving signals from the at least one communications device while the at least one communications device is operating in the one of the idle state and the inactive state, wherein radio resources forming a first of the BWPs at least partially overlap in both frequency and time with radio resources forming a second of the BWPs, and wherein the first BWP and the second BWP have a same numerology.

Paragraph 33. Circuitry for an infrastructure equipment forming part of a wireless communications network, the circuitry comprising transceiver circuitry configured to transmit signals to and/or to receive signals from communications devices, and controller circuitry configured in combination with the transceiver circuitry to transmit, via a broadcasted signal receivable by at least one of the communications devices which is operating in one of an idle state and an inactive state, a configuration of at least two bandwidth parts, BWPs, for use by the infrastructure equipment in transmitting signals to and/or receiving signals from the at least one communications device while the at least one communications device is operating in the one of the idle state and the inactive state, wherein radio resources forming a first of the BWPs at least partially overlap in both frequency and time with radio resources forming a second of the BWPs, and wherein the first BWP and the second BWP have a same numerology.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed, the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] Holma H. and Toskala A, "LTE for UMTS OFDMA and SC-FDMA based radio access", John Wiley and Sons, 2009.

[2] RP-192330, "New work item: 2-step RACH for NR," ZTE Corporation, 3GPP TSG RAN Meeting #85.

[3] RP-192324, "Revised WID: Support of NR Industrial Internet of Things (IoT)," Nokia, Nokia Shanghai Bell, 3GPP TSG RAN Meeting #85.

[4] RP-191575, "NR-based Access to Unlicensed Spectrum," Qualcomm, Inc., 3GPP TSG RAN Meeting #84.

[5] RP-193252, "WID: NR small data transmissions in INACTIVE state," ZTE Corporation, 3GPP TSG RAN Meeting #86.

[6] R2-2009457, "RACH-based Small Data Transmission," LG Electronics, 3GPP TSG RAN2 #112-e.

[7] R2-2009963, "Details of RACH based SDT," Ericsson, 3GPP TSG-RAN WG2 #112e.

[8] R2-2009097, "RACH configuration for Small Data Transmission," Samsung, 3GPP TSG-RAN2 Meeting #112 Electronic.

[9] RP-193163, "WID: NR support of Multicast and Broadcast Services," Huawei, 3GPP TSG RAN Meeting #86.

[10] RP-202094, "Revised SID: Study on NR positioning enhancements," CATT, Intel Corporation, 3GPP TSG RAN Meeting #89e.

[11] Xingqin Lin et al, "A Primer on Bandwidth Parts in 5G New Radio," {Online}; 2 Apr. 2020.

[12] MediaTek, "Bandwidth Part Adaptation (White Paper),", last modified 11 Mar. 2019.

[13] R1-2008168, "Potential positioning enhancements," Samsung, 3GPP TSG RAN WG1 #103-e.

[14] 3GPP TR 38.855 V16.0.0, "3$^{rd}$ Generation Partnership Project; Technical Specification Group Radio Access Network; Study on NR positioning support (Release 16)," 3GPP Organisation, 28 Mar. 2019.

[15] 3GPP TS 38.331 V15.7.0, "3$^{rd}$ Generation Partnership Project; Technical Specification Group Radio Access Network; NR; Radio Resource Control (RRC) protocol specification (Release 15)," 3GPP Organisation, 27 Sep. 2019.

What is claimed is:

1. A method of operating a communications device configured to transmit signals to and/or to receive signals from a wireless communications network, the method comprising:

operating, by the communications device, in one of an idle state and an inactive state and, when operating in the one of the idle state and the inactive state, receiving, via a broadcasted signal from the wireless communications network, a configuration of at least two bandwidth parts (BWPs) for use by the communications device in transmitting signals to and/or receiving signals from the wireless communications network while remaining in the one of the idle state and the inactive state, the communications device, while remaining in the one of the idle state and the inactive state, adapting between the at least two BWPs, wherein radio resources forming a first of the BWPs at least partially overlap in both frequency and time with radio resources forming a second of the BWPs, and wherein the first BWP and the second BWP have a same numerology.

2. The method according to claim 1, wherein the first BWP has a narrower bandwidth than the second BWP.

3. The method according to claim 1, wherein the radio resources of the first BWP are fully contained within the radio resources of the second BWP.

4. The method according to claim 1, further comprising:

transmitting to and/or receiving from the wireless communications network, within the radio resources of the first BWP, data associated with a first group of services, and/or transmitting to and/or receiving from the wireless communications network, within the radio resources of the second BWP, data associated with a second group of services which are different from the first group of services, wherein data associated with the first group of services can be transmitted and/or received within the radio resources of the first BWP at the same time as data associated with the second group of services is transmitted and/or received within the radio resources of the second BWP.

5. The method according to claim 4, wherein the first group of services comprises system information, paging, and initial access, and wherein the second group of services comprises small data transmission (SDT) multicast and broadcast services (MBS) and positioning.

6. The method according to claim 4, further comprising:

determining that the communications device is to transmit and/or receive data associated with at least one of the second group of services within the radio resources of the second BWP.

7. The method according to claim 6, further comprising:

receiving, from the wireless communications network, a downlink control information (DCI) indicator, and determining that the communications device is to transmit and/or receive the data associated with the at least one of the second group of services within the radio resources of the second BWP based on the DCI indicator.

8. The method according to claim 7, wherein the DCI indicator indicates that the communications device is to receive control information for the data associated with the at least one of the second group of services within the radio resources of the first BWP before transmitting and/or receiving the data associated with the at least one of the second group of services within the radio resources of the second BWP in accordance with the control information.

9. The method according to claim 7, wherein the DCI indicator is a group common DCI indicator which is further received from the wireless communications network by one or more other communications devices.

10. The method according to claim 6, further comprising:

determining that the communications device is to transmit and/or receive the data associated with the at least one of the second group of services within the radio resources of the second BWP periodically in accordance with a periodic scheduling of the data associated with the at least one of the second group of services.

11. The method according to claim 6, further comprising:

determining that the communications device is to stop transmitting and/or receiving the data associated with the at least one of the second group of services within the radio resources of the second BWP, and that the communications device is to transmit and/or receive data associated with at least one of the first group of services within the radio resources of the first BWP.

12. The method according to claim 11, wherein the determination is made by the communications device based on the communications device not having transmitted or received any data associated with the at least one of the second group of services within the radio resources of the second BWP for a predetermined period of time.

13. The method according to claim 12, wherein the predetermined period of time is determined by the communications device to have elapsed based on an expiry of an inactivity timer.

14. The method according to claim 12, wherein the predetermined period of time is determined by the communications device to have elapsed in accordance with a discontinuous reception (DRX) mode of operation of the communications device.

15. The method according to claim 4, further comprising:

receiving, from the wireless communications, a configuration of a control resource set (CORESET), the CORESET being specific to the second group of services and being for use by the communications device in receiving a control channel for at least one of the second group of services.

16. The method according to claim 15, wherein the CORESET is located within the radio resources of the first BWP.

17. The method according to claim 15, further comprising:

receiving, from the wireless communications network, an indication of one or more search spaces within the CORESET, each of the one or more search spaces being associated with one of the second group of services and being for monitoring by the communications device for a control channel for the associated one of the second group of services.

18. A communications device comprising:

transceiver circuitry configured to transmit signals to and/or to receive signals from wireless communications networks, and controller circuitry configured in combination with the transceiver circuitry to operate in one of an idle state and an inactive state and, when operating in the one of the idle state and the inactive state, to receive, via a broadcasted signal from the wireless communications network, a configuration of at least two bandwidth parts (BWPs) for use by the communications device in transmitting signals to and/or receiving signals from the wireless communications network while remaining in the one of the idle state and the inactive state, the communications device adapting between the at least two BWPs while remaining on the one of the idle state and the inactive state, wherein radio resources forming a first of the BWPs at least partially overlap in both frequency and time with radio resources forming a second of the BWPs, and wherein the first BWP and the second BWP have a same numerology.

19. Circuitry for a communications device comprising:

transceiver circuitry configured to transmit signals to and/or to receive signals from wireless communications networks, and controller circuitry configured in combination with the transceiver circuitry to operate in one of an idle state and an inactive state and, when operating in the one of the idle state and the inactive state, to receive, via a broadcasted signal from the wireless communications network, a configuration of at least two bandwidth parts (BWPs) for use by the communications device in transmitting signals to and/or receiving signals from the wireless communications network while remaining in the one of the idle state and the inactive state, the communications device adapting between the at least two BWPs while remaining on the one of the idle state and the inactive state, wherein radio resources forming a first of the BWPs at least partially overlap in both frequency and time with radio resources forming a second of the BWPs, and wherein the first BWP and the second BWP have a same numerology.

20. Circuitry for an infrastructure equipment forming part of a wireless communications network, the circuitry comprising:

transceiver circuitry configured to transmit signals to and/or to receive signals from communications devices, and controller circuitry configured in combination with the transceiver circuitry to transmit, via a broadcasted signal receivable by at least one of the communications devices which is operating in one of an idle state and an inactive state, a configuration of at least two bandwidth parts (BWPs) for use by the infrastructure equipment in transmitting signals to and/or receiving signals from the at least one communications device while the at least one communications device is operating in the one of the idle state and the inactive state, the communications device adapting between the at least two BWPs while remaining on the one of the idle state and the inactive state, wherein radio resources forming a first of the BWPs at least partially overlap in both frequency and time with radio resources forming a second of the BWPs, and wherein the first BWP and the second BWP have a same numerology.

* * * * *